United States Patent
Stanford

(10) Patent No.: US 9,237,801 B2
(45) Date of Patent: *Jan. 19, 2016

(54) TABLE TOP WITH A PLURALITY OF CLOSELY SPACED DEPRESSIONS

(71) Applicant: LIFETIME PRODUCTS, INC., Clearfield, UT (US)

(72) Inventor: Carl R. Stanford, Clearford, UT (US)

(73) Assignee: LIFETIME PRODUCTS, INC., Clearfield, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/565,080

(22) Filed: Dec. 9, 2014

(65) Prior Publication Data

US 2015/0083030 A1 Mar. 26, 2015

Related U.S. Application Data

(63) Continuation of application No. 13/778,107, filed on Feb. 26, 2013, now Pat. No. 8,904,623, which is a continuation of application No. 13/311,396, filed on Dec. 5, 2011, now Pat. No. 8,381,666, which is a (Continued)

(51) Int. Cl.
*A47B 3/00* (2006.01)
*A47B 13/08* (2006.01)
(Continued)

(52) U.S. Cl.
CPC . *A47B 13/08* (2013.01); *A47B 3/08* (2013.01); *A47B 3/0809* (2013.01); *A47B 3/091* (2013.01); *A47B 3/0911* (2013.01); *A47B 3/0912* (2013.01); *A47B 13/02* (2013.01); *B29C 49/20* (2013.01); *B29D 7/00* (2013.01);

(Continued)

(58) Field of Classification Search
CPC ...... A47B 13/08; A47B 3/091; A47B 3/0911; A47B 3/0912; A47B 3/0809
USPC ............... 108/132, 131, 129, 115, 27, 161; 29/897, 428

See application file for complete search history.

(56) References Cited

U.S. PATENT DOCUMENTS

| 236,197 A | 1/1881 | Valley |
| 236,741 A | 1/1881 | Weaver |

(Continued)

FOREIGN PATENT DOCUMENTS

| AU | 223700 | 5/1958 |
| BE | 650758 | 11/1964 |

(Continued)

OTHER PUBLICATIONS

U.S. Appl. No. 13/769,782, filed Feb. 18, 2013, Stanford.

(Continued)

*Primary Examiner* — Jose V Chen
(74) *Attorney, Agent, or Firm* — Maschoff Brennan

(57) ABSTRACT

A folding utility table includes a table top having a pair of support pedestals pivotally attached. A first pivotal support brace includes a distal end and a proximal end attached to the first support pedestal. A second pivotal support brace includes a distal end and a proximal end attached to the second support pedestal. In addition, the support pedestals may comprise at least one support leg, and each support leg of the first and second support pedestals may be laterally offset from each other so as to permit an offset displacement of the support legs when the support pedestals are disposed in a collapsed position.

25 Claims, 5 Drawing Sheets

Related U.S. Application Data continuation of application No. 12/538,839, filed on Aug. 10, 2009, now Pat. No. 8,069,796, which is a continuation of application No. 11/932,331, filed on Oct. 31, 2007, now Pat. No. 7,571,686, which is a continuation of application No. 11/554,371, filed on Oct. 30, 2006, now Pat. No. 7,464,654, which is a continuation of application No. 11/208,812, filed on Aug. 22, 2005, now Pat. No. 7,128,002, which is a continuation of application No. 10/963,919, filed on Oct. 13, 2004, now Pat. No. 6,931,999, which is a continuation of application No. 10/385,385, filed on Mar. 10, 2003, now Pat. No. 6,832,563, which is a continuation of application No. 10/097,104, filed on Mar. 12, 2002, now Pat. No. 6,530,331, which is a continuation of application No. 09/635,303, filed on Aug. 9, 2000, now Pat. No. 6,431,092, which is a continuation of application No. 09/228,326, filed on Jan. 11, 1999, now Pat. No. 6,112,674, which is a continuation of application No. 29/095,372, filed on Oct. 21, 1998, now Pat. No. Des. 414,626.

(51) Int. Cl.
| | |
|---|---|
| *A47B 3/091* | (2006.01) |
| *B29C 49/20* | (2006.01) |
| *A47B 3/08* | (2006.01) |
| *B29D 7/00* | (2006.01) |
| *B32B 3/08* | (2006.01) |
| *B32B 3/30* | (2006.01) |
| *A47B 13/02* | (2006.01) |
| *B29C 49/00* | (2006.01) |
| *B29C 49/04* | (2006.01) |
| *B29K 23/00* | (2006.01) |
| *B29K 105/00* | (2006.01) |
| *B29K 105/16* | (2006.01) |
| *B29L 31/44* | (2006.01) |

(52) U.S. Cl.
CPC .............. *B32B 3/085* (2013.01); *B32B 3/30* (2013.01); *B29C 49/00* (2013.01); *B29C 49/0031* (2013.01); *B29C 49/04* (2013.01); *B29C 2049/2008* (2013.01); *B29K 2023/065* (2013.01); *B29K 2105/0032* (2013.01); *B29K 2105/0044* (2013.01); *B29K 2105/16* (2013.01); *B29L 2031/448* (2013.01); *Y10S 108/901* (2013.01); *Y10T 29/4998* (2015.01); *Y10T 29/49826* (2015.01); *Y10T 29/49947* (2015.01); *Y10T 428/1352* (2015.01); *Y10T 428/24008* (2015.01); *Y10T 428/24182* (2015.01); *Y10T 428/24479* (2015.01)

(56) References Cited

U.S. PATENT DOCUMENTS

| | | |
|---|---|---|
| 769,354 A | 9/1904 | Nielson |
| 1,063,642 A | 6/1913 | Birdsall |
| 1,266,929 A | 5/1918 | Enis |
| 1,272,187 A | 7/1918 | Basford |
| 1,296,336 A | 3/1919 | Stine |
| 1,351,013 A | 8/1920 | Stine |
| 1,514,418 A | 11/1924 | Battenfield |
| 1,594,572 A | 8/1926 | Soltesz |
| 1,659,840 A | 2/1928 | Smith |
| 1,709,928 A | 4/1929 | Whitney |
| 1,757,260 A | 5/1930 | Silverman |
| 1,765,766 A | 6/1930 | Lyon |
| 1,823,484 A | 9/1931 | Blumenthal |
| 1,836,934 A | 12/1931 | Morecroft |
| 1,836,943 A | 12/1931 | Temple |
| 1,888,117 A | 11/1932 | Fox |
| 1,956,946 A | 5/1934 | Duffy |
| 2,109,869 A | 3/1938 | Ross |
| 2,257,550 A | 9/1941 | Gay |
| 2,278,810 A | 4/1942 | Virtue |
| 2,326,461 A | 8/1943 | Howe |
| 2,411,658 A | 11/1946 | La Rue |
| 2,452,169 A | 10/1948 | Wells |
| 2,470,869 A | 5/1949 | Schmidt |
| 2,512,473 A | 6/1950 | Alch |
| 2,522,642 A | 9/1950 | Schmidt |
| 2,524,198 A | 10/1950 | La Rue |
| 2,548,682 A | 4/1951 | Price |
| 2,558,465 A | 6/1951 | Seymour |
| 2,568,622 A | 9/1951 | Hagan |
| 2,579,934 A | 12/1951 | Krasney |
| 2,583,247 A | 1/1952 | Aja et al. |
| 2,621,710 A | 12/1952 | Miller |
| 2,647,562 A | 8/1953 | Hoffar |
| 2,661,792 A | 12/1953 | Lysaght |
| 2,670,031 A | 2/1954 | Melges |
| 2,689,158 A | 9/1954 | Mahr |
| 2,690,210 A | 9/1954 | Holick |
| 2,717,028 A | 9/1955 | Villemune |
| 2,717,631 A | 9/1955 | Howe |
| 2,722,971 A | 11/1955 | Gallagher et al. |
| 2,748,837 A | 6/1956 | Beller |
| 2,752,987 A | 7/1956 | Smithers |
| 2,756,082 A | 7/1956 | Pucci |
| 2,766,812 A | 10/1956 | Schrader |
| 2,771,937 A | 11/1956 | Wilson |
| 2,780,506 A | 2/1957 | Howe |
| 2,788,059 A | 4/1957 | Mackintosh |
| 2,800,379 A | 7/1957 | Smithers |
| 2,805,708 A | 8/1957 | Bohn |
| 2,811,197 A | 10/1957 | Nimmo |
| 2,811,400 A | 10/1957 | James |
| 2,823,087 A | 2/1958 | Zimmer |
| 2,825,390 A | 3/1958 | Post |
| 2,831,688 A | 4/1958 | Knox |
| 2,837,141 A | 6/1958 | Shore |
| 2,849,053 A | 8/1958 | Beller et al. |
| 2,878,589 A | 3/1959 | Howe et al. |
| 2,936,820 A | 5/1960 | Blink et al. |
| 2,939,516 A | 6/1960 | Drew |
| 2,959,209 A | 11/1960 | Lakin |
| 2,964,368 A | 12/1960 | Heyer |
| 2,978,754 A | 4/1961 | Wilson |
| 2,983,308 A | 5/1961 | Horowitz |
| 2,992,043 A | 7/1961 | Nelson |
| 2,999,729 A | 9/1961 | Semmelroth |
| 3,025,120 A | 3/1962 | Howe |
| 3,027,209 A | 3/1962 | Nielsen |
| 3,030,728 A | 4/1962 | Wesman |
| 3,041,775 A | 7/1962 | Brown, Jr. et al. |
| 3,079,197 A | 2/1963 | Mugler |
| 3,080,193 A | 3/1963 | Nimmo |
| 3,093,924 A | 6/1963 | Pompa |
| 3,096,866 A | 7/1963 | Glass |
| 3,101,062 A | 8/1963 | Kanzelberger |
| 3,112,954 A | 12/1963 | Kanitz |
| 3,141,424 A | 7/1964 | Seymour |
| 3,143,982 A | 8/1964 | Blink et al. |
| 3,144,236 A | 8/1964 | Clanin |
| 3,166,029 A | 1/1965 | Acton |
| 3,174,796 A | 3/1965 | Brown |
| 3,191,991 A | 6/1965 | Anderson et al. |
| 3,256,037 A | 6/1966 | Giambalvo |
| 3,259,426 A | 7/1966 | Shaw et al. |
| 3,267,886 A | 8/1966 | Glass |
| 3,273,936 A | 9/1966 | Deavers |
| 3,276,815 A | 10/1966 | Cardy |
| 3,337,262 A | 8/1967 | Katzfey et al. |
| 3,349,728 A | 10/1967 | Barecki et al. |
| 3,353,867 A | 11/1967 | Anderson |
| 3,357,729 A | 12/1967 | Krueger |
| 3,410,232 A | 11/1968 | Krueger |
| 3,429,283 A | 2/1969 | Uhor |

(56) References Cited

U.S. PATENT DOCUMENTS

| | | |
|---|---|---|
| 3,439,634 A | 4/1969 | Bender |
| 3,545,738 A | 12/1970 | Stagg |
| 3,574,393 A | 4/1971 | Hughes |
| 3,580,632 A | 5/1971 | Seymour |
| 3,650,560 A | 3/1972 | Wohlk |
| 3,672,719 A | 6/1972 | Haukedahl |
| 3,692,358 A | 9/1972 | Sung |
| 3,731,971 A | 5/1973 | Sjogren |
| 3,762,626 A | 10/1973 | Dorsey |
| 3,765,719 A | 10/1973 | Silver |
| 3,769,920 A | 11/1973 | Weiss |
| 3,788,696 A | 1/1974 | Loewen |
| 3,797,884 A | 3/1974 | Gutierrez |
| 3,857,343 A | 12/1974 | Greenberg |
| 3,885,829 A | 5/1975 | Haeger |
| 3,893,400 A | 7/1975 | Grant |
| 3,905,478 A | 9/1975 | Peterson et al. |
| 3,922,408 A | 11/1975 | Smith |
| 3,960,354 A | 6/1976 | Simikoski |
| 3,994,527 A | 11/1976 | Nikitits et al. |
| 4,040,658 A | 8/1977 | Mayol |
| 4,043,277 A | 8/1977 | Wallace |
| 4,047,754 A | 9/1977 | Cathey |
| 4,052,100 A | 10/1977 | Nikitits et al. |
| 4,060,275 A | 11/1977 | Hansen |
| 4,064,812 A | 12/1977 | Commanda |
| 4,064,815 A | 12/1977 | Baum |
| 4,070,057 A | 1/1978 | Jones |
| 4,072,231 A | 2/1978 | Helms |
| 4,111,482 A | 9/1978 | Jones |
| 4,131,311 A | 12/1978 | Nikitits et al. |
| 4,157,089 A | 6/1979 | Loughrey |
| 4,191,111 A | 3/1980 | Emmert |
| RE30,274 E | 5/1980 | Bolon et al. |
| 4,249,773 A | 2/1981 | Giambalvo |
| 4,289,350 A | 9/1981 | Thomas et al. |
| 4,330,151 A | 5/1982 | Healey |
| 4,382,627 A | 5/1983 | Dean |
| 4,415,199 A | 11/1983 | Wright |
| 4,438,603 A | 3/1984 | Durkan, Jr. |
| 4,462,636 A | 7/1984 | Markson |
| 4,471,969 A | 9/1984 | Zabala et al. |
| 4,487,328 A | 12/1984 | Wilcox |
| 4,489,661 A | 12/1984 | Fitzgerald |
| 4,537,443 A | 8/1985 | Bray |
| 4,538,526 A | 9/1985 | Seeley |
| 4,557,200 A | 12/1985 | Geschwender |
| 4,563,374 A | 1/1986 | Treber |
| 4,572,574 A | 2/1986 | Fischhaber et al. |
| 4,596,196 A | 6/1986 | Gunter et al. |
| 4,606,575 A | 8/1986 | Kodet |
| 4,648,652 A | 3/1987 | Van Kuren |
| 4,653,804 A | 3/1987 | Yoo et al. |
| 4,700,987 A | 10/1987 | Sraka et al. |
| 4,740,032 A | 4/1988 | Olsen et al. |
| 4,744,309 A | 5/1988 | Kiesel et al. |
| 4,759,296 A | 7/1988 | Simpson |
| 4,762,321 A | 8/1988 | Chang |
| 4,762,379 A | 8/1988 | Beam |
| 4,815,394 A | 3/1989 | Ettlinger et al. |
| 4,817,902 A | 4/1989 | Mason |
| 4,822,066 A | 4/1989 | Rehrig |
| 4,826,244 A | 5/1989 | Choi |
| 4,834,450 A | 5/1989 | Stickler |
| 4,841,877 A | 6/1989 | Virtue |
| 4,841,879 A | 6/1989 | Ferguson |
| 4,846,076 A | 7/1989 | Menges, Sr. |
| 4,864,941 A | 9/1989 | Goulter |
| 4,883,314 A | 11/1989 | Sakong |
| 4,903,686 A | 2/1990 | Jennings |
| 4,951,576 A | 8/1990 | Cobos et al. |
| 4,960,303 A | 10/1990 | York |
| 4,998,395 A | 3/1991 | Bezner |
| 5,007,673 A | 4/1991 | Cheng |
| 5,009,170 A | 4/1991 | Spehar |
| 5,014,628 A | 5/1991 | Roberts |
| 5,018,785 A | 5/1991 | Monson et al. |
| 5,029,938 A | 7/1991 | Song |
| 5,060,902 A | 10/1991 | Hartman |
| 5,070,664 A | 12/1991 | Groh et al. |
| 5,104,607 A | 4/1992 | Driska |
| 5,109,778 A | 5/1992 | Berkowitz et al. |
| 5,149,575 A | 9/1992 | Soifer |
| 5,208,084 A | 5/1993 | Rutz |
| 5,240,307 A | 8/1993 | Jones et al. |
| 5,271,338 A | 12/1993 | Bonham |
| 5,279,233 A | 1/1994 | Cox |
| 5,284,100 A | 2/1994 | Thorn |
| 5,314,231 A | 5/1994 | Otterbacher |
| 5,321,873 A | 6/1994 | Goria |
| 5,323,713 A | 6/1994 | Luyk et al. |
| 5,325,793 A | 7/1994 | Martin |
| 5,335,594 A | 8/1994 | Karlyn et al. |
| D350,862 S | 9/1994 | Beller |
| 5,357,872 A | 10/1994 | Wilmore |
| 5,377,601 A | 1/1995 | Cashen |
| 5,383,411 A | 1/1995 | Tomaka |
| 5,394,808 A | 3/1995 | Dutro et al. |
| 5,409,245 A | 4/1995 | Kern et al. |
| 5,411,314 A | 5/1995 | Wallace |
| 5,421,272 A | 6/1995 | Wilmore |
| 5,440,857 A | 8/1995 | Shanok et al. |
| 5,443,020 A | 8/1995 | Price |
| 5,478,040 A | 12/1995 | Rellinger |
| 5,483,901 A | 1/1996 | Tisbo et al. |
| 5,488,926 A | 2/1996 | Hunt |
| 5,505,142 A | 4/1996 | Fink |
| 5,507,484 A | 4/1996 | vanNimwegen |
| 5,536,552 A | 7/1996 | Scripsick |
| 5,622,120 A | 4/1997 | Yeh |
| 5,623,882 A | 4/1997 | Price |
| 5,626,339 A | 5/1997 | Schickert et al. |
| 5,636,578 A | 6/1997 | Rizzi |
| 5,638,761 A | 6/1997 | Berkowitz et al. |
| 5,662,303 A | 9/1997 | Rellinger |
| 5,678,491 A | 10/1997 | Price et al. |
| 5,694,865 A | 12/1997 | Raab |
| 5,730,066 A | 3/1998 | Auten et al. |
| 5,732,637 A | 3/1998 | Raab |
| 5,860,367 A | 1/1999 | Riegel et al. |
| D405,631 S | 2/1999 | Burdick |
| 5,865,128 A | 2/1999 | Tarnay |
| 5,868,081 A | 2/1999 | Raab |
| 5,909,021 A | 6/1999 | Duffy |
| 5,921,623 A | 7/1999 | Nye et al. |
| 5,947,037 A | 9/1999 | Hornberger et al. |
| D414,626 S | 10/1999 | Collins et al. |
| 5,983,807 A | 11/1999 | Tarnay et al. |
| 5,984,047 A | 11/1999 | Rogers |
| 5,992,331 A | 11/1999 | Inoue |
| 6,000,345 A | 12/1999 | Gillotti |
| D419,332 S | 1/2000 | Collins et al. |
| D420,527 S | 2/2000 | Pinch et al. |
| 6,032,585 A | 3/2000 | Pinch |
| D423,258 S | 4/2000 | Pinch |
| 6,058,853 A | 5/2000 | Pinch |
| 6,076,472 A | 6/2000 | Lloyd |
| 6,086,148 A | 7/2000 | Gatto et al. |
| 6,109,687 A | 8/2000 | Nye et al. |
| 6,112,674 A | 9/2000 | Stanford |
| D442,788 S | 5/2001 | Nye et al. |
| 6,334,400 B1 | 1/2002 | Nien |
| 6,347,831 B1 | 2/2002 | Nye et al. |
| 6,371,034 B1 | 4/2002 | Simpson et al. |
| 6,431,092 B1 | 8/2002 | Stanford |
| 6,443,521 B1 | 9/2002 | Nye et al. |
| 6,471,173 B1 | 10/2002 | Tseng |
| 6,520,094 B2 | 2/2003 | Wen |
| 6,530,331 B2 | 3/2003 | Stanford |
| 6,550,404 B2 | 4/2003 | Stanford |
| 6,615,743 B2 | 9/2003 | Nien |
| 6,622,644 B2 | 9/2003 | Buono |
| 6,651,568 B1 | 11/2003 | Buono |
| 6,655,301 B2 | 12/2003 | Stanford |

(56) References Cited

U.S. PATENT DOCUMENTS

| | | |
|---|---|---|
| 6,694,897 B2 | 2/2004 | Lou-Hao |
| 6,732,663 B2 | 5/2004 | Tsai |
| 6,752,091 B2 | 6/2004 | Glover |
| 6,772,700 B2 | 8/2004 | Wong |
| 6,823,806 B1 | 11/2004 | Buono |
| 6,832,563 B2 | 12/2004 | Stanford |
| 6,848,370 B1 | 2/2005 | Stanford |
| 6,877,441 B2 | 4/2005 | Zheng |
| 6,895,872 B2 | 5/2005 | Stanford |
| 6,915,748 B2 | 7/2005 | Stanford |
| 6,920,832 B2 | 7/2005 | Lou-Hao |
| 6,931,999 B2 | 8/2005 | Stanford |
| 6,945,178 B1 | 9/2005 | Nye |
| 6,968,789 B2 | 11/2005 | Baik et al. |
| 7,044,068 B2 | 5/2006 | Stanford |
| 7,051,662 B2 | 5/2006 | Shenghao et al. |
| 7,055,899 B2 | 6/2006 | Zhurong |
| 7,073,450 B2 | 7/2006 | Tsai |
| 7,096,800 B2 | 8/2006 | Stanford |
| 7,100,518 B2 | 9/2006 | Strong |
| 7,100,519 B2 | 9/2006 | Tsai |
| 7,111,563 B2 | 9/2006 | Strong |
| 7,114,453 B2 | 10/2006 | Stanford |
| 7,128,002 B2 | 10/2006 | Stanford |
| 7,143,677 B2 | 12/2006 | Zeder |
| 7,143,702 B2 | 12/2006 | Stanford |
| 7,150,237 B2 | 12/2006 | Lin |
| 7,178,471 B2 | 2/2007 | Strong |
| 7,299,754 B2 | 11/2007 | Stanford |
| 7,299,755 B2 | 11/2007 | Stanford |
| 7,331,297 B2 | 2/2008 | Strong |
| 7,373,889 B2 | 5/2008 | Nye |
| 7,428,872 B2 | 9/2008 | Strong |
| 7,434,522 B2 | 10/2008 | Stanford |
| 7,461,602 B2 | 12/2008 | Stanford |
| 7,461,603 B2 | 12/2008 | Stanford |
| 7,464,654 B2 | 12/2008 | Stanford |
| 7,475,642 B2 | 1/2009 | Shenghao |
| 7,475,643 B2 | 1/2009 | Haney |
| 7,533,619 B2 | 5/2009 | Stanford |
| 7,536,961 B2 | 5/2009 | Stanford |
| 7,571,686 B2 | 8/2009 | Stanford |
| 7,621,224 B2 | 11/2009 | Lin et al. |
| 7,806,060 B2 | 10/2010 | Stanford |
| 8,042,476 B2 | 10/2011 | Stanford |
| 8,069,796 B2 | 12/2011 | Stanford |
| 8,074,582 B2 | 12/2011 | Stanford |
| 8,375,871 B2 | 2/2013 | Stanford |
| 8,381,666 B2 | 2/2013 | Stanford |
| 8,904,623 B2 | 12/2014 | Stanford |
| 2003/0127028 A1 | 7/2003 | Baik et al. |
| 2003/0164123 A1 | 9/2003 | Lou-Hao |
| 2003/0233967 A1 | 12/2003 | Lin |
| 2004/0031422 A1 | 2/2004 | Wong |
| 2004/0187747 A1 | 9/2004 | Shenghao et al. |
| 2004/0187748 A1 | 9/2004 | Shenghao et al. |
| 2004/0194675 A1 | 10/2004 | Shenghao et al. |
| 2004/0194677 A1 | 10/2004 | Degen |
| 2004/0237856 A1 | 12/2004 | Shenghao et al. |
| 2004/0244656 A1 | 12/2004 | Shenghao et al. |
| 2004/0255829 A1 | 12/2004 | Cizmar |
| 2005/0061213 A1 | 3/2005 | Tsai |
| 2005/0061214 A1 | 3/2005 | Tsai |
| 2005/0155534 A1 | 7/2005 | Lin |
| 2005/0160950 A1 | 7/2005 | Haney |
| 2006/0021552 A1 | 2/2006 | Pleiman |
| 2010/0000448 A1 | 1/2010 | Lin et al. |

FOREIGN PATENT DOCUMENTS

| | | |
|---|---|---|
| CA | 2166651 | 7/1996 |
| DE | 341007 | 5/1920 |
| DE | 3705566 | 9/1988 |
| EP | 0572331 | 12/1933 |
| FR | 2553644 | 4/1985 |
| FR | 2637474 | 4/1990 |
| GB | 10007 | 0/1908 |
| GB | 1457271 | 12/1976 |
| GB | 1595210 | 8/1981 |
| JP | 07171877 | 9/1995 |
| JP | 08108464 | 4/1996 |
| JP | 09065934 | 3/1997 |
| JP | H10-75825 | 3/1998 |
| JP | 10192060 | 7/1998 |
| TW | 320006 | 3/1997 |
| WO | WO 94/12075 | 6/1994 |
| WO | WO 95/10204 | 4/1995 |

OTHER PUBLICATIONS

U.S. Appl. No. 13/778,102, filed Feb. 26, 2013, Stanford.
U.S. Appl. No. 13/778,107, filed Feb. 26, 2013, Stanford.
Civil Docket for Case #: 8:02cv00350, 49 pages, May 7, 2004. *Lifetime Products, Inc. v. Alton Industries, Inc., et al.*Case No. SACV 02-350 GLT (ANx), (CDCA).
Amended Complaint for: (1) Patent Infringement; and (2) Inducement of Patent Infringement; Demand for Jury Trial, 15 pages (including Exhibit A), Aug. 6, 2002. . *Lifetime Products, Inc. v. Alton Industries, Inc., et al.*Case No. SACV 02-350 GLT (ANx), (CDCA).
Amended Complaint for: (1) Patent Infringement; and (2) Inducement of Patent Infringement; Demand for Jury Trial, 39 pages (including Exhibits A-B), Oct. 3, 2002. *Lifetime Products, Inc. v. Alton Industries, Inc., et al.*Case No. SACV 02-350 GLT (ANx), (CDCA).
Answer and Counterclaims of Defendant Alton Industries, Inc. to Plaintiff's Amended Complaint, 12 pages, Oct. 17, 2002. *Lifetime Products, Inc. v. Alton Industries, Inc., et al.*Case No. SACV 02-350 GLT (ANx), (CDCA).
Amended Answer of Defendant Maxchief Investments, Ltd. to Plaintiff's Amended Complaint, 8 pages, Dec. 13, 2002. *Lifetime Products, Inc. v. Alton Industries, Inc., et al.* Case No. SACV 02-350 GLT (ANx), (CDCA).
Amended Answer of Defendant Maxchief Investments, Ltd. to Plaintiff's Amended Complaint, 8 pages, Jan. 2, 2003. *Lifetime Products, Inc. v. Alton Industries, Inc., et al.* Case No. SACV 02-350 GLT (ANx), (CDCA).
Reply to Alton's Counterclaims to Amended Complaint; Demand for Jury Trial, 6 pages, Nov. 11, 2002. *Lifetime Products, Inc. v. Alton Industries, Inc., et al.* Case No. SACV 02-350 GLT (ANx), (CDCA).
Maxchief's Second Amended Answer and Counterclaims, 17 pages, Nov. 7, 2003. *Lifetime Products, Inc. v. Alton Industries, Inc., et al.* Case No. SACV 02-350 GLT (ANx), (CDCA)
Lifetime's Reply to Maxchief's Counterclaims, 6 pages, Nov. 18, 2003. *Lifetime Products, Inc. v. Alton Industries, Inc., et al.* Case No. SACV 02-350 GLT (ANx), (CDCA).
Memorandum of Points and Authorities in Support of Defendants' Motion for Summary Judgement of Invalidity of '092 and '404 Patent Claims Asserted Against "BT" Table Products, 29 pages, Mar. 22, 2004. *Lifetime Products, Inc. v. Alton Industries, Inc., et al.* Case No. SACV 02-350 GLT (ANx), (CDCA).
Lifetime's Memorandum in Opposition to Defendants' Motion for Summary Judgement of Invalidity of '092 and '404 Patent Claims Asserted Against "BT" Table Products, 27 pages, Mar. 26, 2004. *Lifetime Products, Inc. v. Alton Industries, Inc., et al.* Case No. SACV 02-350 GLT (ANx), (CDCA).
Defendants' Opposition and Reply Regarding Invalidity of '092 and '404 Patent Claims Asserted Against "BT" Table Products, 32 pages, Apr. 5, 2004. *Lifetime Products, Inc. v. Alton Industries, Inc., et al.* Case No. SACV 02-350 GLT (ANx), (CDCA).
Order on Motion for Summary Judgement of Invalidity, 18 pages, Apr. 21, 2004. *Lifetime Products, Inc. v. Alton Industries, Inc., et al.* Case No. SACV 02-350 GLT (ANx), (CDCA).
Order Denying Cross-Motions for Summary Judgment of Effective Filing Date, 6 pages, Apr. 21, 2004. *Lifetime Products, Inc. v. Alton Industries, Inc., et al.* Case No. SACV 02-350 GLT (ANx), (CDCA).
Order Granting Plaintiff's Motion for Summary Judgment of Literal Infringement, 7 pages, Mar. 29, 2004. *Lifetime Products, Inc. v. Alton Industries, Inc., et al.* Case No. SACV 02-350 GLT (ANx), (CDCA).

(56) References Cited

OTHER PUBLICATIONS

Order Granting Plaintiff's Motion for Summary Adjudication and Defendants' Motion to Modify the Scheduling Order and Denying Plaintiff's Motion for Summary Judgement, 6 pages, Nov. 3, 2003. *Lifetime Products, Inc. v. Alton Industries, Inc., et al.* Case No. SACV 02-350 GLT (ANx), (CDCA).
Order Granting Lifetime's Renewed Motion for Summary Judgment, 7 pages, Jul. 7, 2003. *Lifetime Products, Inc. v. Alton Industries, Inc., et al.* Case No. SACV 02-350 GLT (ANx), (CDCA).
Order Granting in Part Plaintiff's Motion for Summary Judgment of Literal Infringement, 11 pages, Feb. 19, 2003. *Lifetime Products, Inc. v. Alton Industries, Inc., et al.* Case No. SACV 02-350 GLT (ANx), (CDCA).
Order Granting in Part Plaintiff's Motion and Granting in Part Defendants' Motion, 9 pages, Jun. 9, 2003. *Lifetime Products, Inc. v. Alton Industries, Inc., et al.* Case No. SACV 02-350 GLT (ANx), (CDCA).
Stipulation and Order Regarding Dismissal of '552 Patent Claims, 2 pages, Oct. 31, 2003. *Lifetime Products, Inc. v. Alton Industries, Inc., et al.* Case No. SACV 02-350 GLT (ANx), (CDCA).
Civil Minutes—General, Filing of Summary Judgment Orders, 1 page, Apr. 21, 2004. *Lifetime Products, Inc. v. Alton Industries, Inc., et al.* Case No. SACV 02-350 GLT (ANx), (CDCA).
Deposition of Steve Wohlwend, 39 pages, Feb. 2, 2004. *Lifetime Products, Inc. v. Alton Industries, Inc., et al.* Case No. SACV 02-350 GLT (ANx), (CDCA).
Deposition of Mary Jackson, 53 pages, Feb. 3, 2004. *Lifetime Products, Inc. v. Alton Industries, Inc., et al.* Case No. SACV 02-350 GLT (ANx), (CDCA).
Civil Docket for Case #: 8:03cv01248, 8 pages, May 7, 2004. *Lifetime Products, Inc. v. Alton Industries, Inc., et al.* Case No. SACV3-1248 DOC (ANx), (CDCA).
Complaint for: (1) Patent Infringement; and (2) Inducement of Patent Infringement; Demand for Jury Trial, 16 pages, Jan. 29, 2001. *Lifetime Products, Inc. v. Alton Industries, Inc., et al.* Case No. 02-871 GHK (RCx), (CDCA).
Complaint for: (1) Patent Infringement; and (2) Inducement of Patent Infringement; Demand for Jury Trial, 52 pages, Aug. 13, 2003. *Lifetime Products, Inc. v. Maxchief Investments, Limited.* Case No. SACV3-1248 DOC (ANx), (CDCA).
Complaint for: (1) Patent Infringement; and (2) Inducement of Patent Infringement, Demand for Jury Trial, 50 pages (including Exhibits A-B), Aug. 13, 2003. *Lifetime Products, Inc. v. Maxchief Investments, Limited.* Case No. SACV3-1248 DOC (ANx), (CDCA).
Answer of Defendant Maxchief Investments, Ltd. to Plaintiff's Complaint, 11 pages, Aug. 21, 2003. *Lifetime Products, Inc. v. Alton Industries, Inc., et al.* Case No. 02-871 GHK (RCx), (CDCA).
Answer and Counterclaims of Defendant Alton Industries, Inc., 35 pages (including Exhibits A-B), Mar. 2, 2002. *Lifetime Products, Inc. v. Alton Industries, Inc., et al.* Case No. 02-871 GHK (RCx), (CDCA).
Answer of Defendant Maxchief Investments, Ltd. to Plaintiff's Complaint, 11 pages, Aug. 21, 2003. *Lifetime Products, Inc. v. Maxchief Investments, Limited.* Case No. SACV3-1248 DOC (ANx), (CDCA).
Amended Answer and Counterclaims of Defendant Maxchief Investments, Ltd. in Response to Plaintiff's Complaint, 17 pages, Sep. 10, 2003. *Lifetime Products, Inc. v. Maxchief Investments, Limited.* Case No. SACV3-1248 DOC (ANx), (CDCA).
Plaintiff's Reply to Defendant's Counterclaims, 10 pages, Mar. 28, 2002. *Lifetime Products, Inc. v. Alton Industries, Inc.* Case No. 02-871 GHK (RCx), (CDCA).
Lifetime's Reply to Amended Counterclaim, 9 pages, Sep. 25, 2003. *Lifetime Products, Inc. v. Maxchief Investments, Limited.* Case No. SACV3-1248 DOC (ANx), (CDCA).
Lifetime's Reply to Undenominated Counterclaim, 6 pages, Sep. 10, 2003. *Lifetime Products, Inc. v. Maxchief Investments, Limited.* Case No. SACV3-1248 DOC (ANx), (CDCA).
Maxchief's Responses to Plaintiff's Third Set of Interrogatories, 14 pages, Jan. 20, 2004. *Lifetime Products, Inc. v. Maxchief Investments, Limited.* Case No. SACV3-1248 DOC (ANx), (CDCA).

Civil Docket for Case #: 8:03cv00033, 13 pages, May 7, 2004. *Lifetime Products, Inc. v. Blumenthal Distributing, Inc., et al.* Case No. SACV03-33 GLT (ANx), (CDCA).
Stipulation and Order Regarding Defendant's Motion for Summary Judgment that the Asserted Claims of the '092 and '331 and '404 Patents are Not Entitled to the Filing Date of the '626 or '332 Design Patents, 4 pages, Dec. 19, 2003. *Lifetime Products, Inc. v. Blumenthal Distributing, Inc., et al.* Case No. SACV03-33 GLT (ANx), (CDCA).
Order on the Parties' Motions for Summary Judgment, 8 pages, Nov. 3, 2003. *Lifetime Products, Inc. v. Blumenthal Distributing, Inc., et al.* Case No. SACV03-33 GLT (ANx), (CDCA).
Civil Docket for Case #: 8:02cv00146, 6 pages, May 7, 2004. *Lifetime Products, Inc. v. Wen's Phoenix Corporation, et al.* Case No. 8:02cv00146 (CDCA).
Complaint for: (1) Patent Infringement; and (2) Inducement of Patent Infringement; Demand for Jury Trial, 15 pages (including Exhibit A), Feb. 13, 2002.*Lifetime Products, Inc. v. Wen's Phoenix Corporation, LTD., et al.* Case No. SA02-146 DOC (Anx), (CDCA).
Answer of Wen's Phoenix Corporation, Ltd., 8 pages, Mar. 6, 2002. *Lifetime Products, Inc. v. Wen's Phoenix Corporation, LTD., et al.* Case No. SA02-146 DOC (Anx), (CDCA).
Answer of Richard Wen, Demand for Jury Trial, 8 pages, Mar. 6, 2002. *Lifetime Products, Inc. v. Wen's Phoenix Corporation, LTD., et al.* Case No. SA02-146 DOC (Anx), (CDCA).
Counterclaim of Wen's Phoenix Corporation, Ltd. For Declaratory Judgment, Demand for Jury Trial, 13 pages (including Exhibit A), Mar. 6, 2002. . *Lifetime Products, Inc. v. Wen's Phoenix Corporation, LTD., et al.* Case No. SA02-146 DOC (Anx), (CDCA).
Plaintiff's Reply to Defendant's Counterclaim, 8 pages, Mar. 28, 2002. *Lifetime Products, Inc. v. Wen's Phoenix Corporation, LTD., et al.* Case No. SA02-146 DOC (Anx), (CDCA).
Civil Docket for Case #: 8:01cv01217, 18 pages, May 7, 2004. *Lifetime Products, Inc. v. Wen's Phoenix Corporation, et al.* Case No. SA01-1217 GLT (Anx),(CDCA).
Complaint for: (1) Patent Infringement; and (2) Inducement of Patent Infringement; Demand for Jury Trial, 14 pages (including Exhibit A), Dec. 18, 2001. *Lifetime Products, Inc. v. Wen's Phoenix Corporation, et al.* Case No. SA01-1217 GLT (Anx), (CDCA).
Second Amended Complaint for: (1) Patent Infringement; and (2) Inducement of Patent Infringement, Demand for Jury Trial, 88 pages (including Exhibits A-D), Aug. 28, 2003. *Lifetime Products, Inc. v. Wen's Phoenix Corporation, et al.* Case No. SA01-1217 GLT (Anx), (CDCA).
[Proposed] Amended Complaint for: (1) Patent Infringement; and (2) Inducement of Patent Infringement; Demand for Jury Trial, 40 pages (including Exhibits A-B), Sep. 6, 2002. *Lifetime Products, Inc. v. Wen's Phoenix Corporation, et al.* Case No. SA01-1217 GLT (Anx), (CDCA).
Answer of Wen's Phoenix Corporation, Demand for Jury Trial, 8 pages, Jan. 8, 2002. *Lifetime Products, Inc. v. Wen's Phoenix Corporation, et al.* Case No. SA01-1217 GLT (Anx), (CDCA).
Answer of Wen's Phoenix Corporation Limited to the Amended Complaint, 10 pages, Oct. 22, 2002. *Lifetime Products, Inc. v. Wen's Phoenix Corporation, et al.* Case No. SA01-1217 GLT (Anx), (CDCA).
Answer of Richard Wen to the Amended Complaint, 10 pages, Oct. 22, 2002. *Lifetime Products, Inc. v. Wen's Phoenix Corporation, et al.* Case No. SA01-1217 GLT (Anx), (CDCA).
Answer of Defendants Wen's Phoenix Corporation, Wen's Phoenix Corporation Limited and Richard Wen to Second Amended Complaint, Affirmative Defenses, Counterclaim and Demands for a Juty Trial, 13 pages, Sep. 18, 2003. *Lifetime Products, Inc. v. Wen's Phoenix Corporation, et al.* Case No. SA01-1217 GLT (Anx), (CDCA).
Counterclaims of Wen's Phoenix Corporation in Response to the Amended Complaint, 35 pages (Including Exhibits A-B), Oct. 21, 2002. *Lifetime Products, Inc. v. Wen's Phoenix Corporation, et al.* Case No. SA01-1217 GLT (Anx), (CDCA).
Reply to Counterclaim of Wen's Phoenix Corporation in Response to the Amended Complaint, 9 pages, Nov. 11, 2002. *Lifetime Products, Inc. v. Wen's Phoenix Corporation, et al.* Case No. SA01-1217 GLT (Anx), (CDCA).

(56) References Cited

OTHER PUBLICATIONS

Reply to Counterclaims of Wen's Phoenix Corporation, 6 pages, Oct. 3, 2003. *Lifetime Products, Inc.* v. *Wen's Phoenix Corporation, et al.* Case No. SA01-1217 GLT (Anx), (CDCA).
Order Granting in Part Plaintiff's Motion and Granting in Part Defendant's Motion, 9 pages, Jun. 9, 2003. *Lifetime Products, Inc.* v. *Wen's Phoenix Corporation, et al.* Case No. SA01-1217 GLT (Anx), (CDCA).
Civil Docket for Case #: 3:02-CV-00836, 22 pages, May 7, 2004. *NorthPole LLC, et al.* v. *Lifetime Products, Inc.* Case No. C02-00836 CRB, (NDCA).
Complaint for Declaratory Relief Regarding Validity and Infringement of United States Utiligy Patent Nos. 6,112,674, 5,536,552, D414,626 and D419,332, 5 pages, Feb. 19, 2002. *NorthPole LLC, et al.* v. *Lifetime Products, Inc.* Case No. C02-00836 CRB, (NDCA).
Answer and Counterclaims Jury Trial Demanded, 15 pages (including Exhibit A), Apr. 10, 2002. *NorthPole LLC, et al.* v. *Lifetime Products, Inc.* Case No. C02-00836 CRB, (NDCA).
Amended Counterclaims (Jury Trial Demanded), 12 pages (including Exhibit A), Apr. 30, 2002. *NorthPole LLC, et al.* v. *Lifetime Products, Inc.* Case No. C02-00836 CRB, (NDCA).
Supplemental Counterclaims, 27 pages (including Exhibit A), Aug. 13, 2002. *NorthPole LLC, et al.* v. *Lifetime Products, Inc.* Case No. C02-00836 CRB, (NDCA).
NorthPole LLC and NorthPole Limited's Answer to Lifetime Products, Inc.'s Counterclaims, 6 pages, Apr. 30, 2002. *NorthPole LLC, et al.* v. *Lifetime Products, Inc.* Case No. C02-00836 CRB, (NDCA).
NorthPole LLC and NorthPole Limited's Answer to Lifetime Products, Inc.'s Supplemental Counterclaims, 6 pages, Sep. 11, 2002. *NorthPole LLC, et al.* v. *Lifetime Products, Inc.* Case No. C02-00836 CRB, (NDCA).
Preliminary Claim Construction Statement (Patent L.R. 4-2), 7 pages, Dec. 6, 2002. *NorthPole LLC, et al.* v. *Lifetime Products, Inc.* Case No. C02-00836 CRB, (NDCA).
Joint Claim Construction and Prehearing Statement (Patent L.R. 4-3), 19 pages, Dec. 20, 2002. *NorthPole LLC, et al.* v. *Lifetime Products, Inc.* Case No. C02-00836 CRB, (NDCA).
Civil Docket for Case #: 01-CV-157, 18 pages, May 7, 2004. *Lifetime Products, Inc.* v. *Igloo Products Corporation.* Case No. 1:01CV00157B (D. Utah).
Complaint, Jury Trial Demanded, 31 pages (including Exhibits A-E), Dec. 13, 2001. *Lifetime Products, Inc.* v. *Igloo Products Corporation.* Case No. 1:01CV00157B (D. Utah).
Answer to Complaint and Demand for Jury Trial, 16 pages, Jan. 22, 2002. *Lifetime Products, Inc.* v. *Igloo Products Corporation.* Case No. 1:01CV00157B (D. Utah).
Civil Docket for Case #8:02cv00764, 6 pages, May 7, 2004. *Lifetime Products, Inc.* v. *The Hon Company.* Case No. SA02-764 GLT, (CDCA).
Complaint for: (1) Patent Infringement; and (2) Inducement of Patent Infringement, Demand for Jury Trial, 28 pages (including Exhibit A), Aug. 13, 2002. *Lifetime Products, Inc.* v. *The Hon Company.* Case No. SA02-764 GLT, (CDCA).
Defendant The Hon Company's Answer and Separate Defenses to Plaintiff Lifetime Products, Inc.'s Complaint for (1) Patent Infringement and (2) Inducement of Patent Infringement, 8 pages, Sep. 4, 2002. *Lifetime Products, Inc.* v. *The Hon Company.* Case No. SA02-764 GLT, (CDCA).
Civil Docket for Case #01-CV-162, 8 pages, May 7, 2004. *Lifetime Products, Inc.* v. *The Hon Company.* Case No. 1:01CV00162J (D. Utah).
Docket Sheet for 1:03-CV-3943, 9 pages, May 7, 2004. *Lifetime Products, Inc.* v. *GSC Technology Corp.* Case No. 03-C-3943 (N. D. Ill).
Lifetime's Second Amended Complaint for: (1) Patent Infringement; and (2) Inducement of Patent Infringement; Demand for Jury Trial, 87 pages (including Exhibits A-E), Sep. 8, 2003. *Lifetime Products, Inc.* v. *GSC Technology Corp.* Case No. 03-C-3943 (N. D. Ill).
Answer of GCS Technology Corp. to Lifetime's Second Amended Complaint for: (1) Patent Infringement; and (2) Inducement of Patent Infringement, 19 pages, Sep. 22, 2003. *Lifetime Products, Inc.* v. *GSC Technology Corp.* Case No. 03-C-3943 (N. D. Ill).
Amended Answer of GSC Technology Corp. to Lifetime's Second Amended Complaint for: (1) Patent Infringement; and (2) Inducement of Patent Infringement; Affirmative Defenses to Lifetime's Second Amended Complaint, and GSC Technology Corp's Counterclaims, 23 pages, Oct. 10, 2003. *Lifetime Products, Inc.* v. *GSC Technology Corp.* Case No. 03-C-3943 (N. D. Ill).
Lifetime's Reply to GSC Technology Corp.'s Counterclaims; and Jury Demand, 7 pages, Oct. 23, 2003. *Lifetime Products, Inc.* v. *GSC Technology Corp.* Case No. 03-C-3943 (N. D. Ill).
Minute Order of Sep. 9, 2003 by Hon. Ruben Castillo, 1 pages, Sep. 10, 2003. *Lifetime Products, Inc.* v. *GSC Technology Corp.* Case No. 03-C-3943 (N. D. Ill).
Notice of Expert Report of Harry F. Manbeck, Jr. 59 pages (including Exhibits A-E), Mar. 31, 2004. *Lifetime Products, Inc.* v. *GSC Technology Corp.* Case No. 03-C-3943 (N. D. Ill).
Deposition of Carl R. Stanford, 67 pages, Feb. 17, 2004. *Lifetime Products, Inc.* v. *GSC Technology Corp.* Case No. 03-C-3943 (N. D. Ill).
Complaint for (1) Patent Infringement; and (2) Inducement of Patent Infringement, Demand for Jury Trial, 8 pages, Sep. 26, 2002. *Lifetime Products, Inc.* v. *GSC Technology Inc, and GSC Technology, Corp.* Case No. 02-CV-6501 CJS (B), (WD New York).
Amended Complaint for: (1) Patent Infringement; and (2) Inducement of Patent Infringement, Demand for Jury Trial, 35 pages (Including Exhibits A-B), Nov. 13, 2002. *Lifetime Products, Inc.* v. *GSC Technology Inc, and GSC Technology, Corp.* Case No. 02-CV-6501 CJS (B), (WD New York).
Answer of GCS Technology Corp. to the Amended Complaint, 51 pages (including Exhibits A-B), undated. *Lifetime Products, Inc.* v. *GSC Technology Inc, and GSC Technology, Corp.* Case No. 02-CV-6501 CJS (B), (WD New York).
Answer of GCS Forwarding Company, Inc. to the Amended Complaint, 20 pages, undated. *Lifetime Products, Inc.* v. *GSC Technology Inc, and GSC Technology, Corp.* Case No. 02-CV-6501 CJS (B), (WD New York).
Civil Docket for Case #: 02-CV-6, 4 pages, May 7, 2004. *Lifetime Products, Inc.* v. *Correll, Inc.* Case No. 02-CV-6 (D. Utah).
Complaint, Jury Trial Demanded, 12 pages (including Exhibit A), Jan. 23, 2002. *Lifetime Products, Inc.* v. *Correll, Inc.* Case No. 1:02 CV 00006J (D. Utah).
Answer of Correll, Inc., 7 pages, Feb. 15, 2002. *Lifetime Products, Inc.* v. *Correll, Inc.* Case No. 1:02 CV 00006J (D. Utah).
Disclosure of Asserted Claims and Preliminary Infringement Contentions, 7 pages, Sep. 26, 2002. *Northpole LLC, et al.* v. *Lifetime Products, Inc.* Case No. C02-00836 CRB, (NDCA).
Civil Docket for Case #02-CV-1366, 18 pages, May 7, 2004. *Lifetime Products, Inc.* v. *Correll, Inc.* Case No. 02-CV-1366 (D. Utah).
Correll's Answer to Amended Complaint, 7 pages, Oct. 15, 2003. *Lifetime Products, Inc.* v. *Correll, Inc.* Case No. 2:02 CV 01366 (D. Utah).
[Proposed] Amendment, 74 pages (including Exhibits A-C), Sep. 23, 2003. *Lifetime Products, Inc.* v. *Correll, Inc.* Case No. 2:02 CV 01366 TC (D. Utah).
Complaint for: (1) Patent Infringement; and (2) Inducement of Patent Infringement, Demand for Jury Trial, 28 pages (including Exhibit A, Aug. 13, 2002. *Lifetime Products, Inc.* v. *Correll, Inc.* Case No. SA02-763 GLT (MLGx), (D. Utah).
Correll, Inc.'s Answer, 8 pages, Sep. 9, 2002. *Lifetime Products, Inc.* v. *Correll, Inc.* Case No. SA02-763 GLT (MLGx), (D. Utah).
Civil Docket for Case #: 03-CV-13, 7 pages, May 7, 2004. *FDL, Inc.* v. *Lifetime Products, Inc.* Case No. 1:03 CV 0013 TC (D. Utah).
Complaint for Declaratory Judgment, 26 pages (including Exhibit A), Jan. 27, 2003. *FDL, Inc.* v. *Lifetime Products, Inc.* Case No. 1:03 CV 0013 TC (D. Utah).
Lifetime's Answer and Counterclaim, 56 pages (including Exhibits A-B), Mar. 24, 2003. *FDL, Inc.* v. *Lifetime Products, Inc.* Case No. 1:03 CV 0013 TC (D. Utah).
Lifetime's Amended Answer and Counterclaim, 67 pages (including Exhibits A-C), Mar. 27, 2003. *FDL, Inc.* v. *Lifetime Products, Inc.* Case No. 1:03 CV 0013 TC (D. Utah).

(56) References Cited

OTHER PUBLICATIONS

FDL's Reply to Lifetime's Second Amended Counterclaim and FDL's Counterclaim, 51 pages (icluding Exhibits A-B), Jun. 9, 2003. *FDL, Inc. v. Lifetime Products, Inc.* Case No. 1:03 CV 0013 TC (D. Utah).
Lifetime's Answer to FDL's Counterclaim in Reply, 4 pages, Aug. 13, 2003. *FDL, Inc. v. Lifetime Products, Inc.* Case No. 1:03 CV 0013 TC (D. Utah).
[Proposed] Lifetime's Second Amended Counterclaim, 88 pages (including Exhibits A-D), May 5, 2003. *FDL, Inc. v. Lifetime Products, Inc.* Case No. 1:03 CV 0013 TC (D. Utah).
Complaint for: (1) Patent Infringement; and (2) Inducement of Patent Infringement, Demand for Jury Trial, 30 pages (including Exhibit A), Jan. 10, 2003. *Lifetime Products, Inc. v. Bi-Mart Acquisition Coporation, et al.* Case No. SA C003-3300C (MCGx).
Amended Complaint for: (1) Patent Infringement; and (2) Inducement of Patent Infringement, Demand for Jury Trial, 77 pages (including Exhibits A-C); Aug. 13, 2003. *Lifetime Products, Inc. v. Bi-Mart Acquisition Coporation, d/b/a Office Star Products, Inc.* Case No. SA CV 03-33 GLT, (ANx).
Answer of Defendant Office Star Products to Plaintiffs Complaint, 9 pages, Apr 4, 2003. *Lifetime Products, Inc. v. Bi-Mart Acquisition Coporation, d/b/a Office Star Products, Inc.* Case No. SA CV 03-33 GLT, (ANx).
Petition for Cancellation, 4 pages, Feb. 11, 1998. *Lifetime Products v. Palmer/Snyder Furniture Company.* Trademark Registration No. 2,082,650; Filed: Jul. 22, 1997; Mark: "The Durable Table Company." TTAB.
Amendment and Response to Final Office Action, 8 pages, Apr. 3, 2000. Applicant: Carl R. Stanford; U.S. Appl. No. 09/228,326, filed Jan. 11, 1999; For: Portable Folding Utility Table with Center Support Assembly; USPTO.
Second Supplemental Responses and Objections to Plaintiff's First Set of Interrogatories to Defendant GSC Technology Inc., 134 pages, Mar. 12, 2004. *Lifetime Products, Inc. v. GSC Technology Corp.* Case No. 03 cv 3943 (N.D. Illinois).
Supplemental Responses of Defendant Maxchief Investments, Ltd. to Plaintiff's First Set of Interrogatories, 10 pages (including Exhibits), Sep. 17, 2003. *Lifetime Products, Inc. v. Alton Industries, Inc. and Maxchief Investments, Ltd.* Case No. 02-350 GLT (ANx).
Supplemental Responses of Defendant Alton Industries, Inc. to Plaintiff's Interrogatories, 21 pages (including Exhibits), Sep. 10, 2003. *Lifetime Products, Inc. v. Alton Industries, Inc. and Maxchief Investments, Ltd.* Case No. 02-350 GLT (ANx).
Defendant Office Star Products' Responses to Plaintiff's Second Set of Interrogatories, 37 pages, Dec. 23, 2003. *Lifetime Products, Inc. v. Office Star Products,* Case No. SA CV 03-33 GLT (ANx).
Supplemental Responses of Defendant Maxchief Investments, Ltd. to Plaintiff's First Set of Interrogatories, 7 pages, Apr. 22, 2003. *Lifetime Products, Inc. v. Alton Industries, Inc. and Maxchief Investments, Ltd.* Case No. 02-350 GLT (ANx).
Responses of Defendant Maxchief Investments, Ltd. to Plaintiff's First Set of Interrogatories, 44 pages, Mar. 4, 2003. *Lifetime Products, Inc. v. Alton Industries, Inc. and Maxchief Investments, Ltd.* Case No. 02-350 GLT (ANx).
Responses of Defendant Alton Industries, Inc. to Plaintiff's Third Set of Interrogatories, 32 pages, Feb. 18, 2003. *Lifetime Products, Inc. v. Alton Industries, Inc. and Maxchief Investments, Ltd.* Case No. 02-350 GLT (ANx).
Defendant's Answers to Plaintiff's First Set of Interrogatories, 24 pages, Jun. 12, 2002. *Lifetime Products, Inc. v. Alton Industries, Inc. and Maxchief Investments, Ltd.* Case No. 02-350 GLT (ANx).
Declaration of Raymond Werner Reuteler to Authenticate His Translation of French Patent 2,553,655B1, 17 pages (including Exhibits A-B). *FDL, Inc. v. Lifetime Products, Inc.* Case No. 1:03 CV 0013 TC (D. Utah).
Declaration of Kyotaka Okada to Authenticate His Translation of Japanese Patent Application No. 10-75825, 17 pages (including Exhibits A-B). *FDL, Inc. v. Lifetime Products, Inc.* Case No. 1:03 CV 0013 TC (D. Utah).

Third Declaration of R. Bryon Pipes, Ph.D., 8 pages, Nov. 6, 2003. *FDL, Inc. v. Lifetime Products, Inc.* Case No. 1:03 CV 0013 TC (D. Utah).
Expert Report of Rollin Dix Concerning Validity and Related Matters, 43 pages, Mar. 26, 2004. *Lifetime Products, Inc. v. GSC Technology Corp.* Case No. 03 cv 3943(N.D. Illinois).
Claim Construction, 14 pages, May 24, 2004. *Lifetime Products, Inc. v. GSC Technology Corp. and GSC Forwarding Company, Inc.* (N.D. Illinois).
Order, 39 pages, Jun. 2, 2004. *Lifetime Products, Inc. v. Correll Inc. and FDL, Inc. v. Lifetime Products, Inc.* (D. Utah).
Declaration of Michael Long (Exhibit X), 4 pages, Sep. 10, 2003.
Expert Report on Prior Art and Validity Issues, 213 pages, Mar. 15, 2004. *Lifetime Products, Inc. v. Alton Industries, Inc., Maxchief Investments, Ltd., and Blumenthal Distributing, Inc.* (dba Office Star Products).
Lifetime's Memorandum in Support of Motion for Reconsideration of Order on Motion for Summary Judgment of Invalidity, 17 pages (including Exhibit), May 3, 2004.
All-Luminum Products, Inc., 27 x 8 Main Table and Parts, 8 pages, Jul. 6, 2005.
All-Luminum Products, Inc., 36 Position Leisure Lounge, 1 page.
All-Luminum Products, Inc., Adjust-A-Bed, 1 page.
All-Luminum Products, Inc., Advertising Art & Copy, 6 pages.
All-Luminum Products, Inc., All-Luminum . . . The Action Line Manufacturers of Fine Folding Furniture, 6 pages.
All-Luminum Products, Inc., All-Luminum Products Casual Furniture, 11 pages, Oct. 1, 1988.
All-Luminum Products, Inc., Alumilite Tables, 2 pages, 1975.
All-Luminum Products, Inc., Ambassador Planned Profit Program, 8 pages.
All-Luminum Products, Inc., Atlas Chromite-Finish Folding Legs, 1 page.
All-Luminum Products, Inc., Atlas Folding Table, 2 pages.
All-Luminum Products, Inc., Beauty-Fold Casual Furniture, 8 pages.
All-Luminum Products, Inc., Beauty-Fold Tables, 1 page.
All-Luminum Products, Inc., Casual Furniture Classics, 2 pages.
All-Luminum Products, Inc., Cutting Table, 6 pages, Sep. 6, 2000.
All-Luminum Products, Inc., Design-A-Wall, 1 page.
All-Luminum Products, Inc., Fanta Furniture, 1 page.
All-Luminum Products, Inc., Fanta Furniture/Pro-Action Tennis Table, 2 pages.
All-Luminum Products, Inc., Fine Folding Furniture, 1 page.
All-Luminum Products, Inc., Formwood, Sew Tables/Atlas Legs/Adjust-a-Table, 1 page.
All-Luminum Products, Inc., Gimbels, Folding Drop-leaf Table 36". times.72", 1 page.
All-Luminum Products, Inc., Lightweight Centerfold Banquet Table, 1 page.
All-Luminum Products, Inc., Marshall Field & Company, Adjustable, 1 page.
All-Luminum Products, Inc., Model No. PT 2760, 1 page.
All-Luminum Products, Inc., Rest Assured on All-Luminum Folding Beds, 1 page.
All-Luminum Products, Inc., Rollaway Beds, 1 page.
All-Luminum Products, Inc., Round Table, 1 page.
All-Luminum Products, Inc., Spring Sun-Cot, 1 page.
All-Luminum Products, Inc., Tables, 1 page.
All-Luminum Products, Inc., Tables/Cot, 1 page.
Atlas Table ad sheet, Published by All-Luminum, Inc. 1988-1990.
E-Mail Correspondence: Utility Table and the LDS Church, 1 page, Apr. 23, 1998.
Costco Item Worksheet, 3 pages, undated.
Duratable Model 2100/2150, Exhibit 704-A, 6 pages, Aug. 1, 1996.
E-Mail Correspondence: Trip Report, 1 page, Jan. 29, 1997.
E-Mail Correspondence: Weekly Report, 1 page, Mar. 24, 1997.
E-Mail Correspondence: Jan. 29, 1997 Meeting Notes, 1 page, Jan. 28, 1997.
E-Mail Correspondence: 2120 Banquet Table, May 2, 1995.
E-Mail Correspondence: Costco—Utility Table Trip Report, 1 page, Jun. 17, 1998.
E-Mail Correspondence: Costco Utility Table Trip Report, 1 page, Jan. 8, 1998.

(56) References Cited

OTHER PUBLICATIONS

E-Mail Correspondence: Leisure Status Mar. 11, 1997, 2 pages, Mar. 11, 1997.
E-Mail Correspondence: Prototype Sample for Telescoping Banquet Table, 1 page, Apr. 6, 1995.
E-Mail Correspondence: Trip Report for Sam's, 1 page, Oct. 22, 1997.
E-Mail Correspondence: Trip Report Home Depot/Big 5/Sport Chalet, 2 pages, Dec. 4, 1996.
E-mail Correspondence: Trip Report, 2 pages, Jan. 29, 1997.
E-Mail Correspondence: Utility Table and the LDS Church, 1 page, Apr. 23, 1998.
Fixtures Furniture, Jan. 1991, List price workbook, rec'd. Oct. 24, 1991, p. 112 #01001 table top at lower right, copy in design library.
Frontier N.W. Banquet Tables, 1 page, May 4, 1995.
Frontier N.W., Inc. Correspondence to Rick Noegel, 1 page, Oct. 17, 1997.
Frontier N.W., Inc. Correspondence to Scott Hines, Exhibit 869, 4 pages, Apr. 1, 1997.
Globe Business Furniture, De-Lite Compact Folding Table, letter and brochure, Jan. 1, 1993.
Huffy Sports, "Performance Series," Product Information Brochure, 5 pages.
Lifetime Correspondence to Jeff Pierson, 1 page, Jan. 6, 1996.
Lifetime Correspondence to Mary Derheim, 2 pages, May 24, 1995.
Lifetime Leisure Correspondence to Deanne Witt, 1 page, Jan. 28, 1997.
Lifetime Leisure Correspondence to Rick Noegel, 1 page, Oct. 28, 1996.
Lifetime Leisure One-Minute Set-Up Picnic Tables, Apr. 1997 (5 pages).
Lifetime Leisure, DuraTable Two in One, 1 page, undated.
Lifetime Leisure, DuraTable, Exhibit 865, 2 pages, Apr. 30, 1997.
Lifetime Leisure, Inc., Correspondence to Rick Noegel, Exhibit 891, 5 pages, Oct. 28, 1996.
Lifetime Leisure, Price List, Feb. 1, 1995.
Lifetime Model 2150, Apr. 1997 (7 pages).
Lifetime Picnic Table, Jul. 1997 (4 pages).
Lifetime Products Banquet Table Testing Standards, 1 page, Dec. 15, 1997.
Lifetime Six Foot Utility Table, date unknown (12 pages).
Lifetime, Six foot Utility Table, 1 page, undated.
Lifetime, Table Prototype A, 1 page, undated.
Lifetime, Table Prototype B, 3 pages, undated.
Lifetime, Table Prototype C, 3 pages, updated.
Pre-Jan. 11, 1998 2900 Calls on Costco, 1 page, date unknown.
PriceCostco Vendor Agreement (Basic), 1 page, undated.
Quote: PriceCostco, 1 page, May 24, 1995.
Sample Storage & Assembly, Exhibit 880-880A, 2 pages, date unknown.
Transfer Sheet, 1 page, May 9, 1997.
Virco, c1970, p. 41, folding table #6200.
Virco, c1970, p. 47, Folding Table #6000.
Windsor Metal Products, 5 pages.
Translation of Invalidation Decision issued by Chinese State Intellectual Property Office on Dec. 27, 2011 for Chinese Patent No. 200710181918.0.
Notice of Allowance dated Aug. 24, 2012 from U.S. Appl. No. 12/897,569.
Notice of Allowance dated May 31, 2012 from U.S. Appl. No. 12/897,569.
Notice of Allowance dated Mar. 7, 2012 from U.S. Appl. No. 12/897,569.
Office Action dated May 15, 2012 from U.S. Appl. No. 12/897,569.
Office Action dated Sep. 30, 2011 from U.S. Appl. No. 12/897,569.
Notice of Allowance dated Aug. 31, 2012 from U.S. Appl. No. 13/280,283.
Notice of Allowance dated Aug. 6, 2012 from U.S. Appl. No. 13/280,283.
Office Action dated Apr. 6, 2012 from U.S. Appl. No. 13/280,283.
Office Action dated May 15, 2012 from U.S. Appl. No. 13/311,396.
Office Action dated Apr. 17, 2012 from U.S. Appl. No. 13/316,760.
Notice of Allowance dated Oct. 22, 2012 from U.S. Appl. No. 13/311,396.
Office Action dated May 13, 2013 from U.S. Appl. No. 13/778,102.
Office Action dated Aug. 6, 2012 from U.S. Appl. No. 13/769,782.
Office Action dated Feb. 14, 2014 from U.S. Appl. No. 13/778,107.
Notice of Allowance dated Oct. 10, 2014 from U.S. Appl. No. 13/778,107.

TABLE TOP WITH A PLURALITY OF CLOSELY SPACED DEPRESSIONS

CROSS-REFERENCE TO RELATED APPLICATIONS

This application is a continuation of U.S. patent application Ser. No. 13/778,107, filed Feb. 26, 2013, now U.S. Pat. No. 8,904,623; which is a continuation of U.S. patent application Ser. No. 13/311,396, filed Dec. 5, 2011, now U.S. Pat. No. 8,381,666; which is a continuation of U.S. patent application Ser. No. 12/538,839, filed Aug. 10, 2009, now U.S. Pat. No. 8,069,796; which is a continuation of U.S. patent application Ser. No. 11/932,331, filed Oct. 31, 2007, now U.S. Pat. No. 7,571,686; which is a continuation of U.S. patent application Ser. No. 11/554,371, filed Oct. 30, 2006, now U.S. Pat. No. 7,464,654; which is a continuation of U.S. patent application Ser. No. 11/208,812, filed Aug. 22, 2005, now U.S. Pat. No. 7,128,002; which is a continuation of U.S. patent application Ser. No. 10/963,919, filed Oct. 13, 2004, now U.S. Pat. No. 6,931,999; which is a continuation of U.S. patent application Ser. No. 10/385,385, filed Mar. 10, 2003, now U.S. Pat. No. 6,832,563; which is a continuation of U.S. patent application Ser. No. 10/097,104, filed Mar. 12, 2002, now U.S. Pat. No. 6,530,331; which is a continuation of U.S. patent application Ser. No. 09/635,303, filed Aug. 9, 2000, now U.S. Pat. No. 6,431,092; which is a continuation-in-part of U.S. patent application Ser. No. 09/228,326, filed Jan. 11, 1999, now U.S. Pat. No. 6,112,674; which is a continuation-in-part of U.S. patent application Ser. No. 29/095,372, filed Oct. 21, 1998, now U.S. Pat. No. Des. 414,626, all of which are incorporated herein by reference in their entireties.

BACKGROUND OF THE INVENTION

1. The Field of the Invention

The present invention is related to a utility table, and more particularly, to a portable folding utility table having one or more center support assemblies and off-set support legs that selectively support the utility table above a surface.

2. The Technical Background

Portable folding utility tables are indispensable for groups or organizations that have limited floor space usable for multiple purposes. For example, foldable utility tables can be placed in a pre-determined configuration to meet the space requirements of a school gymnasium, a church multi-purpose room, or a hotel conference meeting room. Afterward, the tables can be neatly stored away and the conference or meeting room used for a different purpose. Thus, portable folding utility tables allow a group or organization to maximize the efficiency and utility of a particular space.

Foldable utility tables can also provide an immediate temporary work space in a garage, tool shed, and the like. The portability and foldability of these utility tables allows a user to conveniently set up, take down, and store the table whenever and wherever the user chooses.

A major drawback with many portable folding utility tables of the prior art, however, is their inherent size and bulkiness. Many such utility tables require two people to collapse and store the table after use. Moreover, some prior art portable folding utility tables are heavy enough to cause injury if dropped or mishandled. These unwieldy tables are usually made from hardwood, particle board, or similarly heavy materials. In an attempt to overcome this weight and bulkiness problem, some prior art portable utility tables are formed of lighter-weight materials. However, many of these light-weight utility tables generally lack the sturdiness of the heavier-weight prior art utility tables.

Another disadvantage to prior art utility tables is the means used for attaching the table support legs or two or more support pedestals to the underside of the table. As will be appreciated, prior art table support legs are typically attached to the table top using threaded screws or bolts that are drilled into the underside of the table top. This means of attachment may compromise the integrity of the table top thereby making it weaker at the point of attachment between the table support legs and the table top. Other attachment mechanisms may include a form of bonding the table support legs as support pedestals directly against the surface of the table top. Often, however, this means of attachment by bonding weakens the structural integrity of the table top. Thus, when the table support legs fail, a portion of the material forming the table top may pull away at the point of the bonded attachment thereby making the table costly, if not impossible to repair.

In an attempt to overcome the foregoing disadvantages, prior art utility tables were developed by those skilled in the art that are equipped with complex or heavy-duty attachment mechanisms that facilitate a secure attachment between the table support legs or the support pedestals and the table top. These types of attachment mechanisms, however, are normally heavier, more costly, more difficult to install, and typically require additional time to manufacture.

The previously stated disadvantages are compounded by the fact that many prior art utility tables incorporate a separate and distinct attachment mechanism for attaching each table support leg or pedestal to the table top. As appreciated, most existing portable folding utility tables have two sets of support legs or pedestal supports, one at each end of the table. Each of these supports is typically attached to the underside of the table top at two places or points of contact. Correspondingly, many of these types of utility tables have at least four separate points of attachment, each attachment between the support legs or pedestal supports facilitated by a separate attachment mechanism. One particular problem with utility tables having separate and distinct attachment mechanisms is that they are generally susceptible to bowing in the center of the table top under stress. This is especially true with larger banquet style tables.

Yet another drawback with many prior art utility tables is that the hard materials used to maintain a sufficient rigidity and sturdiness of the table top often have sharp edges which may be uncomfortable for the user to lean against or rest their arms upon. Further, these materials may also be susceptible to damage or degradation from the elements of nature.

In addition, smaller utility tables that are found in the prior art usually comprise shortened support legs that fail to provide sufficient height to the table top in relation to the underlying surface, thus these types of table are generally uncomfortable to users. In particular, when these prior art utility tables are configured in the folded position for storage, the table support legs are required to be short enough so not to interfere with each other when folded in a conventional fashion underneath the table top. Small folding utility tables of the prior art are also typically bulky when disposed in the folded position because complex and unwieldy mechanisms are generally required to accommodate the use of longer support legs that may be incorporated to overcome the inherent height deficit found in most smaller utility tables.

From the foregoing, it will be appreciated that it would be an advancement in the art to provide a portable folding utility table that is durable enough to withstand the increased wear and tear that portable utility tables are subjected to over long periods of time and sturdy enough to support varying sized loads that will be placed on the table, while at the same time being light-weight enough to be easily set up and taken down.

It would be another advancement in the art to provide a portable folding utility table having a leg or support pedestal attachment mechanism that does not involve a complex design, heavy duty attachment hardware, or need to be screwed, bolted, or bonded to the under side of the table top. It would be a further advancement in the art to provide a portable folding utility table that minimizes the points of attachment to the surface of the table top and facilitates attachment mechanisms that interrelate with each other to support the table top above an underlying surface.

Furthermore, it would be an advancement in the art to provide a portable folding utility table that may provide a smaller working surface than larger utility table, but that is comfortable to work at in relation to its height disposition and which is capable of withstanding the elements of nature.

Finally, it would be an advancement in the art to provide a portable folding utility table in which the support legs or pedestals, having a length greater than the corresponding length of the table top, can fold against the underside of the table top when disposed for storage without interfering with each other, so that smaller frames and table tops can be used that accommodate a sufficient height disposition in relation to the underlying support surface.

Such a portable folding utility table is disclosed and claimed herein.

BRIEF SUMMARY OF THE INVENTION

The present invention is directed to a novel portable folding utility table having a center support assembly. The utility table includes a table top supported by a pair of support pedestals. In one presently preferred embodiment, the table top includes a mounting surface and a working surface formed opposite the mounting surface. The working surface may be textured and may include an outer periphery, at least a portion of which is beveled to provide comfort to a user.

A first end of each support pedestal is preferably attached to the mounting surface of the table top. In one presently preferred embodiment, the support pedestals are pivotally attached to the mounting surface of the table top, to allow each support pedestal to be moved between a collapsed position and an extended position for supporting the table top above a surface. A securing member may also be attached to the mounting surface for releasably securing one or more support pedestals in the collapsed position.

Additionally, the utility table may include a first pivoting support brace attached to the first support pedestal at a proximal end and to the mounting surface at a distal end thereof. Similarly, a second pivoting support brace may be attached to the second support pedestal at a proximal end and to the mounting surface at a distal end thereof. In one presently preferred embodiment of the present invention, the distal ends of the first and second pivotal support braces are disposed contiguous to each other at a retention assembly attached to the mounting surface or, in the alternative, to a support frame.

In one presently preferred embodiment of the present invention, the retention assembly may include a single cross-brace member disposed through openings formed at the distal ends of the pivotal support braces and secured to the mounting surface. The mounting surface may be configured such that opposing ends of the cross-brace member are introduced through openings disposed in opposing sides of the mounting surface of the table top and may further include a mount for receiving and retaining the cross-brace member therein. Thus, the distal ends of both support pedestals are preferably attached along the length of the cross-brace member which is secured to the mounting surface, thereby reducing the number of attachment mechanisms and interrelating the support pedestals to the table top to increase structural support and efficiency of manufacture.

In another presently preferred embodiment, each support pedestal includes a first member pivotally engaging the mounting surface of the table top and a second member configured for telescoping engagement with the first member. This configuration permits the height of the support pedestal to be disposed between a lengthened position and a retracted position.

In an alternative presently preferred embodiment, the table may include two cross-brace members providing separate attachment points for the first and second pivotal support braces. Such a configuration is particularly desirable for tables having an extended length, in which it may not be advantageous for each of the pivotal support braces to have lengths sufficient for extending into the center of the table top. Correspondingly, a dual cross-brace configuration may provide additional space for accommodating one or more user's legs under the table top.

Moreover, in yet another presently preferred embodiment of the present invention, each support pedestal may include two legs slightly offset from the corresponding legs of the other support pedestal disposed on the opposing side of the table top, so that longer support legs can be accommodated under a smaller table top when disposed above an underlying surface. This off-set distance is sufficient to keep the support legs of the opposing support pedestal from interfering with one another, thus allowing displacement substantially against the mounting surface of the table top when disposed in the retracted position for storage.

From the foregoing, it will be appreciated that the present invention provides a portable folding utility table that is durable enough to withstand increased wear and tear yet is light-weight for easy set up and take down. The present invention also provides a novel center support assembly that provides increased structural stability to the table top with efficient design such that to allow the interrelation of the support pedestals. The center support assembly is also cost effective to manufacture and does not compromise the structural integrity of the table top. Further, the present invention provides a utility table that facilitates a height that is comfortable for one or more users to work at. The foregoing and other advantages and features of the present invention will become more fully apparent by examination of the following description of the presently preferred embodiments and appended claims, taken in conjunction with the accompanying drawings.

These and other objects and features of the present invention will become more fully apparent from the following description and appended claims, or may be learned by the practice of the invention as set forth hereinafter.

BRIEF DESCRIPTION OF THE DRAWINGS

To better understand the invention, a more particular description of the invention will be rendered by reference to the appended drawings. These drawings only provide information concerning typical embodiments of the invention and are not to be considered limiting of its scope. The invention will be described and explained with additional specificity and detail through the use of the accompanying drawings, in which.

DETAILED DESCRIPTION OF THE PREFERRED EMBODIMENTS

It will be readily understood that the components of the present invention, as generally described and illustrated in the Figures herein, could be arranged and designed in a wide variety of different configurations Thus, the following more detailed description of the embodiments of the assembly and method of the present invention, as represented in FIGS. 1 through 5, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
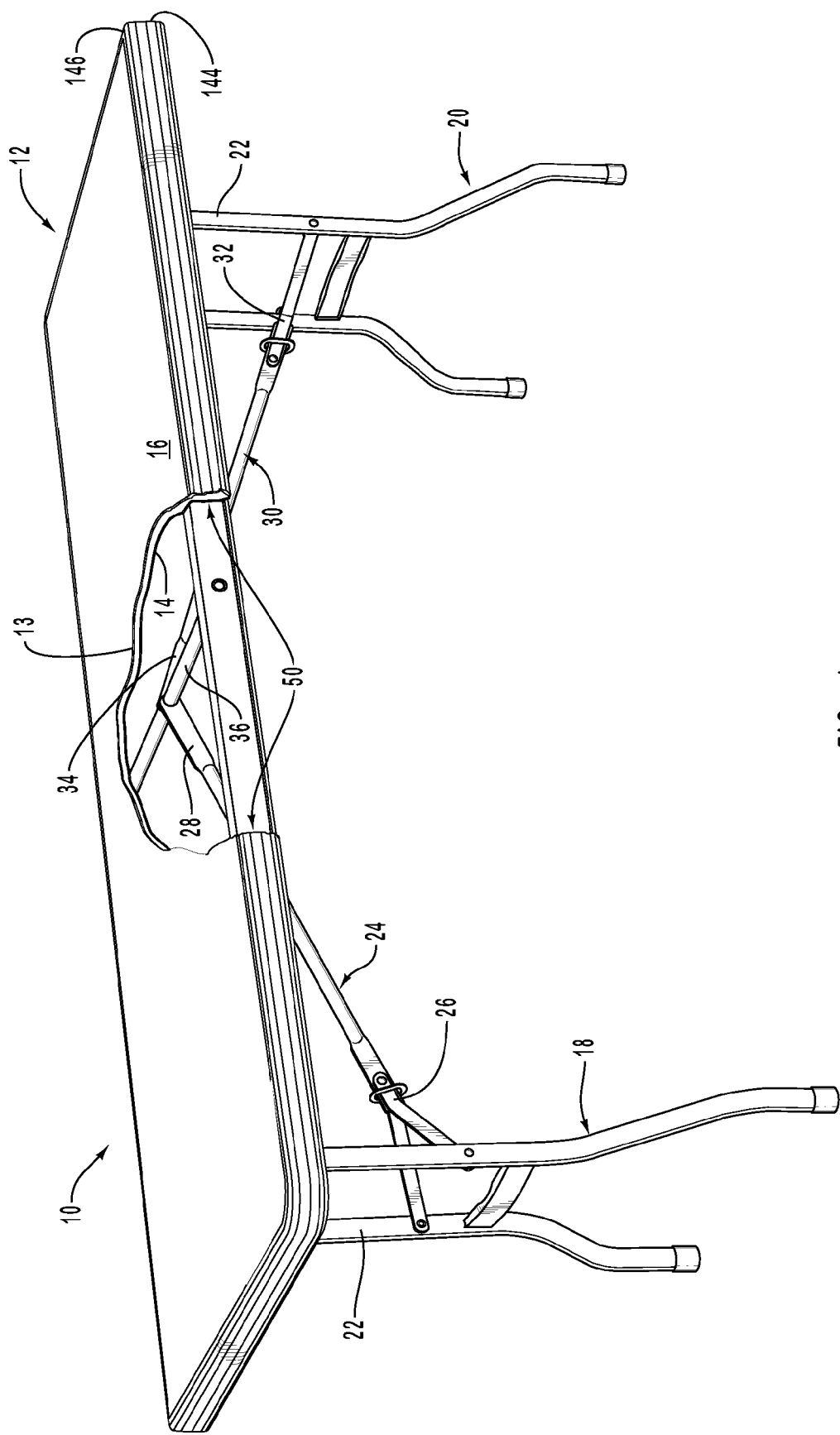
FIG. 1 is a perspective cut-away view of one presently preferred embodiment of a portable folding utility table with center support assembly.
Figure 2:
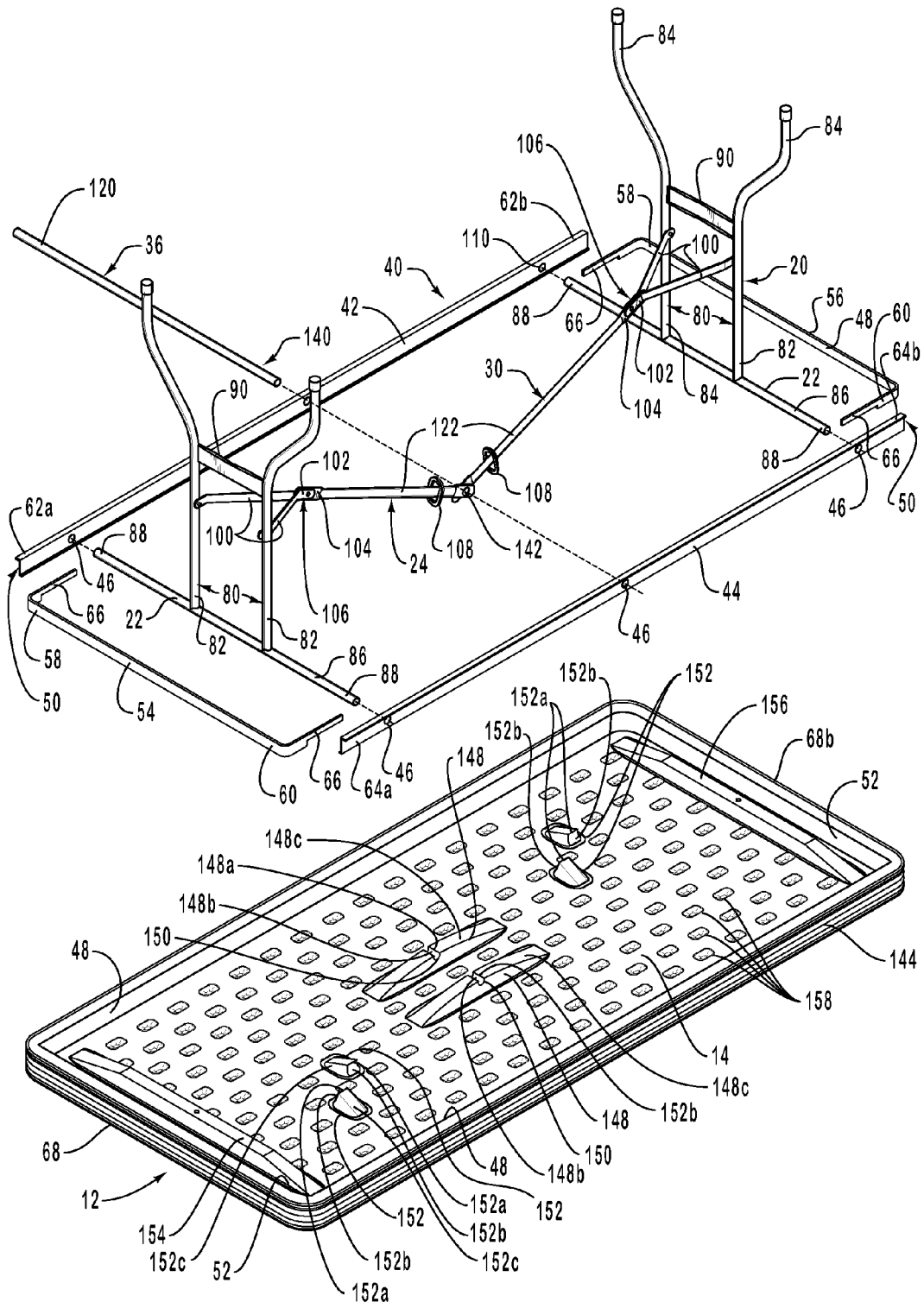
FIG. 2 is an exploded, perspective view of the embodiment of FIG. 1 illustrating various components of the present invention.

One presently preferred embodiment of the present invention, designated generally at 10, is best illustrated in FIGS. 1 and 2. As shown, with particular reference to FIG. 1, a utility table according to the present invention is generally designated at 10. The utility table 10 preferably includes a table top 12 having a mounting surface 14 and a working surface 16 disposed opposite the mounting surface 14. In one presently preferred embodiment, the table top 12 is supported by a first support pedestal 18 and a second support pedestal 20. The first and second support pedestals 18, 20 may each comprise a first end 22 attached to the mounting surface 14 of the table top 12.

Referring now to FIGS. 1 and 2, the utility table 10 of one presently preferred embodiment includes a first pivotal support brace 24 having a proximal end 26 attached to the first support pedestal 18 and a distal end 28 attached to the mounting surface 14. Similarly, a second pivotal support brace 30 is shown having a proximal end 32 attached to the second support pedestal 20 and a distal end 34 attached to the mounting surface 14. The distal end 28 of the first pivotal support brace 24 may be disposed contiguous the distal end 34 of the second pivotal support brace 30. The distal ends 28, 34 of the pivotal support braces 24, 30 are disposed in relation to a retaining assembly 36, which may be attached to the mounting surface 14. In one preferred embodiment, the retaining assembly 36 comprises a cross member.

As shown in FIG. 2, the utility table 10 includes a frame 40. The frame 40 may comprise a first side rail 42 and an opposing second side rail 44. Preferably, the first side rail 42 is disposed substantially parallel the opposing second side rail 44, thereby providing a generally longitudinal alignment therebetween. The first and second side rails 42, 44 may be configured with a plurality of retaining apertures 46 to facilitate attachment of the support pedestals 18, 20 and the cross brace member 36 to the frame 40.

In one presently preferred embodiment, the mounting surface 14 of the table top 12 comprises opposing longitudinal interior side walls 48 and opposing orthogonal interior side walls 52 disposed along an interior periphery of the table top 12. The first and second side rails 42, 44 may be secured to respective opposing longitudinal side walls 48, thus adding rigidity and strength to the structural integrity of table top 12. In one presently preferred embodiment, the side rails 42, 44 are secured to the opposing longitudinal side walls 48 by fasteners. It will be appreciated by those skilled in the art that the side rails 42, 44 may be secured to the opposing longitudinal side walls 48 of the mounting surface 14 using any number or variety of fasteners readily known in the art, such as, for example, screws, bolts, rivets, adhesives, or the like.

The cross-section of the side rails 42, 44 may be configured having an S-shape. In one presently preferred embodiment, the side rails 42, 44 may be attached to the respective longitudinal side walls 48, 50 as to form respective channels 50 along the side rails 42, 44 between the side rails 42, 44 and the longitudinal side walls 48 (See FIGS. 1 and 2). In this configuration, the first end 22 of the support pedestals 18, 20 may be positioned within opposing respective retaining apertures 46 formed in the side rails 42, 44 abutting the longitudinal side walls 48 within the channels 50, thereby substantially preventing lateral movement of the support pedestals 18, 20 relative to the table top 12. Likewise, the cross brace member 36 may be positioned within opposing respective retaining apertures 46 formed in the side rails 42, 44 abutting the longitudinal side walls 48 within the channels 50, thereby substantially preventing lateral movement of the cross brace member 36 relative to the table top 12. In one presently preferred embodiment, the support pedestals 18, 20 and the cross brace member 36 are preferably disposed substantially parallel to each other and in spaced-apart relationship, wherein the cross brace member 36 is positioned between the opposing support pedestals 18, 20. Still referring to FIG. 2, the frame 40 may also comprise a first end rail 54 and an opposing second end rail 56. Preferably, the first end rail 54 is disposed substantially parallel to the opposing end rail 56. Each end rail 54, 56 has a first end 58 and a second end 60 and is preferably positioned along the opposing orthogonal interior side walls 52 of the mounting surface 14 of the table top 12. In one presently preferred embodiment, the first end 58 of each end rail 54, 56 is disposed within the channel 50 adjacent respective ends 62a, 62b of the first side rail 42. Likewise, the second end 60 of each end rail 54, 56 is disposed within a channel 50 adjacent respective ends 64a, 64b of the second side rail 44, thereby providing a generally rectangular shape to substantially correspond with the generally preferable rectangular shape of the table top 12.

In one presently preferred embodiment of the present invention, the first and second ends 58, 60 of respective end rails 54, 56 are configured with a tab member 66. The tab member 66 may be configured to fit within respective channels 50 beneath the retaining aperture 46 near the ends 62, 64 of the respective side rails 42, 44 with the utility table 10 in an upright position. It will be readily appreciated by those skilled in the art that, in this configuration, the tab members 66 act as levers with the support pedestals 18, 20 (positioned within the channels 50 near the ends 62, 64 of the respective side rails 42, 44), thus acting as corresponding fulcrums. In this manner, the end rails 54, 56 strengthen respective ends 68a, 68b of the table top 12, and protect against bowing of the table top 12 at the ends 68a, 68b. The first and second side rails 42, 44 in combination with the first and second end rails 54, 56 provide a means for structurally supporting the table top 12, the support pedestals 18, 20, and the pivotal support braces 24, 30. In this configuration, lighter weight table tops 12 may be used with this novel construction without losing rigidity or structural integrity.

As will be appreciated, the end rails 54, 56 may interrelate to the side rails 42, 44 in a variety of ways to provide structural support for the utility table 10 and help protect against bowing under various loads that may be applied to the utility table 10 For example, the end rails 54, 56 may be welded to the side rails 42, 44. The end rails 54, 56 may also be bonded to the side rails 42, 44 using a variety of suitable epoxies or resins. Further, the end rails 54, 56 and the side rails 42, 44 may be formed as a single unitary piece configured to the desired size and shape. Moreover, it will be also appreciated that the end rails 54, 56 and the side rails 42, 44 need not interrelate at all, but could simply be attached to the respective interior opposing side walls 48, 52 of the mounting surface 14 of the table top 12.

In one presently preferred embodiment of the present invention, the frame 40 is formed of a substantially sturdy, rigid material sufficient to provide structural integrity to the table top 12. For example, the frame 40 may be formed of metal. However, it will be readily appreciated that the frame may be formed of a wide variety of other suitable materials which are consistent with the spirit and scope of the present invention. It will further be appreciated that the size and configuration of the frame 40 will depend, in part, on the size and configuration of the table top 12. Accordingly, the table top 12 and the frame 40 may be configured in a variety of shapes and configurations, including, but not limited to, a circle, polygon, square, rectangle, triangle, or any other suitable geometrical configuration.

Figure 3:
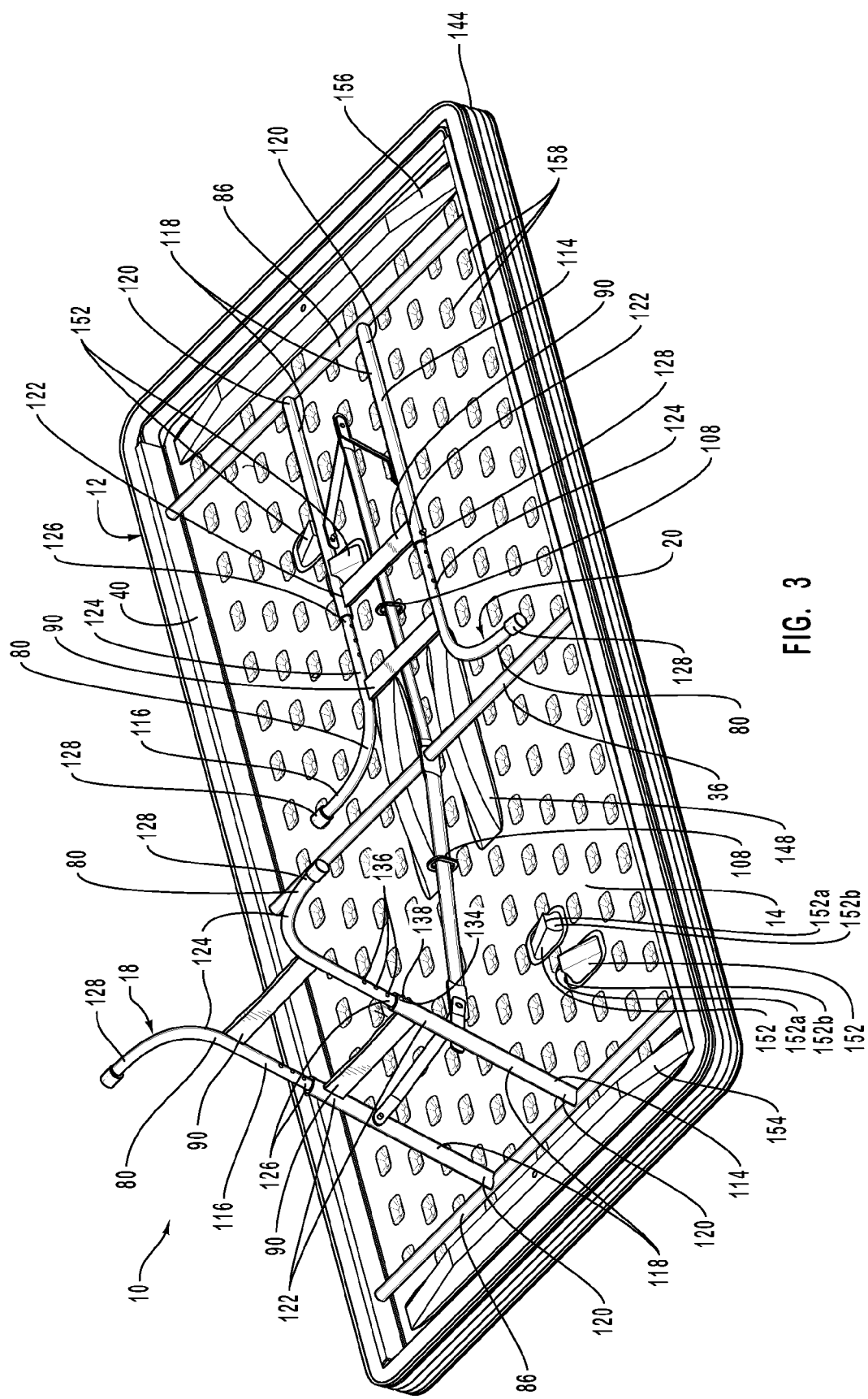
FIG. 3 is a perspective view of the embodiment of FIG. 1 illustrates a retaining assembly and support pedestals in relation to a mounting surface of the table top.

Referring now to FIG. 3, the shape and size of the frame 40 is configured to generally conform to the periphery of the mounting surface 14 of the table top 12.

Specifically, in one presently preferred embodiment of the present invention, the frame 40 is attached in relation to the mounting surface 14 by means of fasteners (not shown) which generally penetrate both the frame 40 and an adjacent point of contact of the mounting surface 14. As will be appreciated by those skilled in the art, a variety of other suitable means or methods for attaching the frame 40 to the mounting surface 14 of the table top 12 may be employed, including, but not limited to, rivets, screws, bolts, glues, epoxies, or other bonding materials.

As can be best seen in FIGS. 2 and 3, the mounting surface 14 of the table top 12 is preferably configured to facilitate the attachment of the frame 40 to the mounting surface of the table top 12, in one presently preferred embodiment, the mounting surface 14 is configured with seats (not shown) positioned such that the end rails 54, 56 may be positioned between respective opposing orthogonal interior walls 52 and the seats (not shown). In this configuration, the end rails 54, 56 are substantially prevented from bowing inwardly toward the center of the utility table 10 under loads exerted upon the opposing ends of the table top.

It will be readily appreciated that the mounting surface 14 need not have interior side walls 48, 52 at all to practice the teachings of the present invention. In this regard, the teachings of the present invention may be practiced without a frame 40 if the table top 12 is sufficiently rigid. It will further be appreciated by those skilled in the art that in the embodiments where there is 110 frame, the support pedestals 18, 20 and cross brace member 36 may be attached to an interior portion of the mounting surface 14. Further, in preferred embodiments where there are interior side walls 48, 52 but no frame 40, the support pedestals 18, 20 and cross brace member 36 may be positioned directly in retaining apertures (not shown) formed within the interior side walls 48, 52 of the mounting structure 14 of the table top 12.

Referring back to FIG. 2, the support pedestals 18, 20 are pivotally attached to the mounting surface 14, thereby permitting each of the support pedestals 18, 20 to be moved between a collapsed position, in which each support pedestal 18, 20 lies flat in substantially the same plane as the table top 12, and an extended position, in which each support pedestal 18, 20 is folded outward, substantially perpendicular to the plane of the table top 12.

Each support pedestal 18, 20 may include a pair of substantially parallel legs, or posts 80. Those of ordinary skill in the art will appreciate that the teachings of the present invention can be practiced if each support pedestal 18, 20 has more or less than two posts 80. Each pair of posts 80 comprises a first end 82 and a second opposing end 84. In one presently preferred embodiment, the first end 82 of each respective pair of posts 80 is secured to a cross pole 86. Respective ends 88 of each cross pole 86 are preferably positioned within opposing retaining apertures 46 disposed within the opposing side rails 42, 44 of the frame 40 such that the support pedestals 18, 20 may be disposed substantially parallel to each other. In this configuration, each cross pole 86 rotates within respective pairs of retaining apertures 46 when respective support pedestals 18, 20 move between the collapsed position and the extended position. In one presently preferred embodiment, a stabilizer arm 90 is preferably disposed between the respective pairs of posts 80 to assist in structurally maintaining the spaced-apart relationship of the posts 80.

It will be appreciated by those skilled in the art that the support pedestals 18, 20 may be configured in a variety of ways such that to practice the teachings of the present invention. For example, the support pedestals 18, 20 may comprise a solid or integral piece or the posts 80 may be curved in a different manner (e.g., see FIG. 3). It will further be appreciated by those of skill in the art that the support pedestals 18, 20 need not be in pivotal engagement with the table top 12 to be collapsible. For example, the support pedestals 18, 20 may simply be detachably engaged in relation to the table top 12 such that when it is desired to collapse the utility table 10 for storage, the support pedestals 18, 20 are removed from selective engagement with the table top 12.

As stated above, the first and second support pedestals 18, 20 are preferably connected to the table top 12 by means of the first and second pivotal support braces 24, 30, respectively. In one presently preferred embodiment of the present invention, the proximal ends 26, 32 of the respective pivotal support braces 24, 30 are bifurcated to facilitate pivotal engagement with the posts 80 of the respective support pedestals 18, 20 as illustrated in FIGS. 1, 2, and 3. The bifurcated proximal ends of the pivotal support braces 24, 30 each preferably comprise a pair of angled members 100.

Referring specifically to FIG. 2, the angled members 100 may include a tab member 102 which pivotally engages and partially overlaps a corresponding tab member 104 adjacent each of the distal ends 28, 34 of the pivotal support braces 24, 30, respectively, at an overlapping portion 106. When the support pedestals 18, 20 are in the extended position, the tabs 102 of the angled members 100 of the bifurcated proximal ends 26, 32 are disposed substantially parallel to the tabs 104 adjacent each distal end 28, 34 of the pivotal support braces 24, 30. When the support pedestals 18, 20 are in the collapsed position, the tabs 102 of the angled members 100 of the bifurcated proximal ends 26, 32 are disposed substantially unparallel to the tabs 104 adjacent each distal end 28, 34 of the pivotal support braces 24, 30. The utility table 10 may include a pair of locking collars 108 which slidably engage respective pivotal support braces 24, 30. The locking collars 108 are preferably sized to fit over respective overlapping portions 106 of the pivotal support braces 24, 30 when the support pedestals 18, 20 are in the extended position. With the locking collars 108 positioned over respective overlapping portions 106, the bifurcated proximal ends 26, 32 are prevented from moving relative to corresponding distal ends 28, 34 of the pivotal support braces 24, 30, thus preventing the support pedestal supports 18, 20 from being positioned in the collapsed position without first disengaging the locking collars 108, respectively. It will be appreciated by those skilled in the art that with the utility table 10 in an upright position and the support pedestals 18, 20 in the extended position, the collars 108 may, under the force of gravity, position themselves about the overlapping portions 106. It will be further appreciated that a variety of other locking mechanisms as assemblies may be utilized to lock the support pedestals 18, 20 in the extended position which are consistent with the spirit and scope of the present invention, including latches or other fasteners.

With reference now to FIG. 3, the utility table 10 is shown having an alternative configuration of the support pedestals 18, 20. In this alternate embodiment, each support pedestal 18, 20 comprises a first member 114 pivotally engaged to the mounting surface 14 of the table top 12 and a second member 116 configured for telescoping engagement with the first member 114, thereby permitting the height of each support pedestal 18, 20 to be selectively disposed at a plurality of predetermined heights between a lengthened position and a retracted position.

In one presently preferred embodiment, each first member 114 of the support pedestals 18, 20 includes a pair of outer members 118 each having a proximal end 120 and a distal end 122. The proximal end of each outer member 118 is connected to the table top 12 by means of the cross pole 86 to which they are preferably fixed (e.g., welded). The second member 116 of each support pedestal 18, 20 includes a pair of inner members 124 each having a proximal end 126 and a distal end 128. The proximal end 126 of the inner members 124 are configured in dimensional size and shape to engage the distal ends 122 of the outer members 118 in telescopic engagement. It will be appreciated by those of ordinary skill in the art that one or more stabilizer arms 90 may be employed to support the telescopic pedestals 18, 20.

Preferably, the inner members 124 and outer members 118 are separated by a hard plastic bushing (not shown) to facilitate the slidable movement of the inner members 124 relative to the outer members 118. Each bushing may be held in place with two small extensions that extend through small holes (not shown) in the outer members 118. It will be appreciated by those of skill in the art that there are a number of ways to facilitate the telescopic movement of the first member 114 relative to the second member 116 of each support pedestal 18, 20.

In the preferred embodiment illustrated in FIG. 3, the support pedestals 18, 20 include means for locking the support pedestals 18, 20 in preselected positions between the refracted position and the lengthened position. At least one of the inner members 124 is configured with a first hole 134. A corresponding outer member 118 may be configured with at least one hole 136 and preferably a plurality of holes 136 positioned such that at a preselected table top 12 height the first hole 134 in the inner member 124 may be aligned with a second hole 136 in the outer member 118. In one presently preferred embodiment, a snap pin mechanism 138 may be positioned adjacent the first hole 134 within the inner member 124 such that the pin 138 is biased outwardly through the aligned holes 134, 136, thereby locking the inner and outer members 118, 124 of the support pedestals 18, 20 in a preselected position. By supplying sufficient force to the pin mechanism 138, it may be disengaged and removed from the hole 136 in the outer member 118, thereby permitting relative movement between the inner 124 and outer 118 members of the support pedestals 18, 20 and allowing the support pedestals 18, 20 to be selectively raised or lowered. It will be appreciated by those skilled in the art that a variety of other adjustment mechanisms as assemblies known in the art for locking the first and second support pedestals 18, 20 in an extended position may be utilized and are herein incorporated.

As best shown in FIGS. 1, 2, and 3, the distal ends 28, 34 of each pivotal support brace 24, 30 are engageably secured to the retaining assembly 36 (e.g., cross brace member). In one presently preferred embodiment of the present invention, the distal ends 28, 34 of each pivotal support brace 24, 30, respectively, are pivotally attached to the retaining assembly 36. Each of said distal ends 28, 34 are configured with an opening 142 having an interior periphery sufficient for engaging at least a portion of the linear length of the cross-brace member 36.

It will be appreciated by those skilled in the art that the retaining assembly 36 generally provides structural support to the center of the table top 12 of the utility table 10. It will further be appreciated that with the distal ends 28, 34 attached contiguous each other in retention to the cross brace member 36 forces applied to the table top 12 which would ordinarily be transferred through one of the support pivotal braces 24, 30, respectively, into the table top 12 causing it to bow, will substantially be nullified by the counter force provided by the opposing pivotal support brace 24, 30, respectively.

For example, the horizontal component of a force applied by a user at one end 68a of the table top 12 will act upon the pivotal support brace 18 and, because the distal ends 28, 34 of the pivotal support braces 24, 30, respectively, are attached to the retaining assembly 36, an equal and opposite horizontal force component applied by the other pivotal support brace 20 will substantially cancel out the horizontal component of the original force. Accordingly, the present invention provides increased structural support to the table top 12 with fewer parts. As will be appreciated by those skilled in the art, the retaining assembly 36 can be disposed in a variety of configurations which are consistent with the spirit and scope of the present invention so as to allow the pivotal support braces 24, 30 to supportably interrelate with each other. Such alternative configurations are discussed below.

With reference to FIGS. 1, 2, and 3, the table top 12 is preferably formed of a blow-molded plastic, and specifically, high density polyethylene. It will be appreciated by those of skill in the art, however, that the table top 12 may be formed of a variety of other sufficiently sturdy materials such as, plywood, particle board, solid wood, wood slates, metal alloys, fiberglass, ceramics, graphite, any of numerous organic, synthetic or processed materials, including thermoplastic or thermosetting polymers of high molecular weight with or without additives, such as, plasticisers, auto oxidants, extenders, colorants, ultraviolet light stabilizers, or fillers and/or other composite materials.

Referring back to FIG. 1, in one presently preferred embodiment of the present invention, the working surface 16 of the table top 12 may be smooth or, in the alternative, textured, if desired. In addition, the working surface 16 may comprise an outer periphery 144 having at least a portion 146 which is beveled to increase the comfort of a person resting their arms against the edges of the table top 12. In one presently preferred embodiment, the entire outer periphery 144 of the working surface 16 of the table top 12 is beveled. The height of the blow-molded table top 12 of one presently preferred embodiment is about five centimeters, the thickness of any pan 13 of the blow-molded table top 12 is preferably about one-half of a centimeter to about three-quarters of a centimeter.

Referring now to FIGS. 2 and 3, the mounting surface 14 may include at least one mounting member 148. Preferably, a pair of mounting members 148 is attached to the mounting surface 14 to receive and retain the cross brace member 36 of the retaining assembly. Each mounting member 148 includes a groove 150 configured as a corresponding size and shape sufficient to retain the cross brace member 36 therein. In one presently preferred embodiment, the cross brace member 36 may be snap fit into the groove 150 of the mounting member 148.

In greater detail, as shown in FIG. 2, the mounting member 148 preferably includes an engagement portion 148a, and an opening 148b to the groove 150. The engagement portion 148a, the opening 148b, and the groove 150 cooperate to retain the cross brace member 36 within the mounting member 148. For example, the cross brace member 36 is preferably snap fit into the groove 150 of each mounting member 148 by pushing the cross brace member 36 into the opening 148b of the mounting member 148. The opening 148b preferably has a size slightly smaller than the size of the cross brace member 36. Because the cross brace member 36 is slightly larger than the opening 148b, the engagement portion 148a of the mounting member 148 temporarily deforms to allow the cross brace member 36 to enter the groove 150. When the cross brace member 36 is inserted into the groove 150, the engagement portion 148a returns to its normal position and the cross brace member 36 is securely retained by the mounting member 148.

The mounting member 148 may also have one or more supporting portions 148c. The supporting portions 148c desirably securely attach the mounting member 148 to the mounting surface 14 of the table top 12. As shown in the accompanying figures, the supporting portions 148c preferably extend longitudinally along the length of the table 10 and they have a sloped or curved outer surface that extends from the engagement portion 148a to the mounting surface 14 of the table top. One skilled in the art will readily appreciate that the mounting member 148 may have other suitable shapes and configurations depending, for example, upon the size and combination of the cross brace member 36 to be attached to the table top 12.

Advantageously, the mounting member 148 may be integrally formed as part of a one-piece structure with the table top 12. In particular, the mounting member 148 is preferably constructed as an integral part of the table top 12 when it is formed from a blow-molded plastic such as high density polyethylene. Significantly, if the mounting member 148 is integrally formed as part of the table top 12, the mounting member 148 does not have to be screwed, bolted, bonded or otherwise connected to the mounting surface 14 of the table top. Thus, the integrally formed mounting member 148 does not compromise the integrity or decrease the strength of the table top 12 by requiring the mounting member to be screwed, bolted or bonded to the table top. One skilled in the art, however, will understand that the mounting member 148 could be connected to the table top 12 by any suitable mechanism or method such as fasteners, adhesives and the like.

Additionally, the mounting surface 14 of the table top 12 may further include one or more securing members 152 for securing each of the support pedestals 18, 20, respectively. Preferably, a pair of securing members 152 are disposed in relation to the mounting surface 14 for releasably securing a respective support pedestal 18, 20 in the collapsed position adjacent the mounting surface 14. Each securing member 152 is generally configured and disposed relative to the mounting surface 14 such that when the support pedestals 18, 20 are in the collapsed position, at least one securing member 152 frictionally engages a support pedestal post 80 such that the support pedestals 18, 20, respectively, are maintained in the collapsed position, as illustrated in FIG. 3. In one presently preferred embodiment, a pair of securing members 152 are offset on opposing sides of a single support pedestal post 80 for securing each of the support pedestals 18 or 20, respectively, in the collapsed position. It will be apparent that other mechanisms may be constructed in accordance with the inventive principles set forth herein for securing the support pedestals 18, 20 in the collapsed position. It is intended, therefore, that the examples provided herein be viewed as exemplary of the principles of the present invention, and not as restrictive to a particular structure for implementing those principles.

It will also be apparent that the securing members 152 may be configured to contact any desired portion of the support pedestals. For example, the securing members 152 may be configured to engage post 80 along either the first member 114, as shown in FIG. 3, the second member 116, or both, if desired. Alternatively, securing members 152 could be disposed on the mounting surface 14 to engage both posts 80 of a respective support pedestal 18, 20. One skilled in the art will appreciate that the securing members 152 could be disposed in any suitable positions depending, for example, upon the desired portion of the support pedestal to be engaged by the securing members.

In greater detail, as shown in FIGS. 2 and 3, each securing member 152 desirably includes an engagement portion 152a, a receiving portion 152b and a support portion 152c. The engagement portion 152a includes a lip or forwardly extending extension that overhangs at least a portion of the receiving portion 152b. The receiving portion 152b is sized and configured to receive a portion of the support pedestal 18, 20, such as the post 80. The support portion 152c supports the securing member 152 in the desired location.

The engagement portion 152a and receiving portion 152b of the securing member 152 cooperate to releasably secure a respective support pedestal 18, 20 in the collapsed position. For example, when it is desired to move a support pedestal 18, 20 into the collapsed position, the pedestal is pivoted towards the mounting surface 14 of the table top 12. As the support pedestal 18, 20 approaches the table top 12, a portion of the support pedestal contacts the engagement portion 152a. This contact causes the engagement portion 152a to temporarily deform or move to allow a portion of the support pedestal 18, 20 to be received by the receiving portion 152b. Once the support pedestal 18, 20 is received within the receiving portion 152b, the engagement portion 152a returns to its original shape or position, and that prevents the support pedestal 18, 20 from being inadvertently released from the securing member 152. The support pedestal 18, 20 is now secured in its collapsed position within the securing member 152, as shown in FIG. 3. When it is desired to move the support pedestal 18, 20 from the collapsed position to an extended position, the support pedestal is simply pivoted away from the mounting surface 14 of the table top 12 with a force sufficient to remove the support pedestal from the receiving portion 152b and past the engagement portion 152a, thereby removing the support pedestal from the securing member 152.

As seen in FIGS. 2 and 3, the receiving portion 152b preferably has a curved surface to receive the support pedestal 18, 20. In particular, the receiving portion 152b preferably has a concave surface and the engagement portion 152a includes an extension or lip that extends at least partly beyond the concave surface of the receiving portion 152b. Advantageously, the engagement portion 152a and receiving portion 152b allow the support pedestal 18, 20 to be snap fit into the securing member 152. One skilled in the art will appreciate that the engagement portion 152a and receiving portion 152b may have other suitable configurations depending, for example, upon the shape and configuration of the support pedestal 18, 20 or the position of the support pedestal to be releasably secured by the securing member 152.

The securing member 152 preferably includes one or more support portions 152c to securely attach the securing member 152 to the mounting surface 14 of the table top 12. As shown in the accompanying figures, the supporting portion 152c preferably extends in the opposing direction as the receiving portion 152b and has a sloped or curved outer surface that extends from the engagement portion 152a to the mounting surface 14 of the table top 12. One skilled in the art will understand that the securing member 152 may have other suitable shapes and configurations depending, for example, upon the size and configuration of the portion of the support pedestal 18 20 to be releasably secured.

Advantageously, the securing member 152 may be integrally formed as part of a one-piece structure with the table top 12. In particular, the securing member 152 is preferably constructed as an integral part of the table top 12 when it is formed from a blow-molded plastic such as high density polyethylene. Significantly, if the securing member 152 is integrally formed as part of the table top 12, it does not have to be screwed, bolted, bonded or otherwise connected to the mounting surface 14 of the table top. Thus, the integrally formed securing member 152 does not compromise the integrity or decrease the strength of the table top 12 by requiring the securing member to be screwed, bolted or bonded to the table top. One skilled in the art, however, will understand that the securing member 152 could be connected to the table top 12 by any suitable mechanism or method such as fasteners, adhesives and the like.

As best shown in FIGS. 2 and 3, a first manifold 154 and a second manifold 156 are preferably disposed at opposing ends 68a, 68b of the table top 12. The manifolds 154, 156 provide additional support for the ends 68a, 68b of the table top 12 and assist in facilitating the blow molding process by providing a means for uniformly dispersing air down the length of the table top 12. The mounting surface 14 of the table top 12 may also include a plurality of depressions 158 (e.g., kiss-offs) which tend to add structural support and integrity to the table top 12. In one presently preferred embodiment, these depressions 158 are uniformly distributed throughout the mounting surface 14 of the table top 12.

The structural features of the table top 12, including the beveled edges and/or textured working surface 16, the mounting members 148, the securing members 152, the manifolds 154, 156, and the depressions 158 may be integral with the table top 12 and may be formed by means of a corresponding mold and blow-molding process. It will be appreciated by those skilled in the art that there are alternative ways to create and attach these features. For example, the mounting members 148, securing members 152, and manifolds 154, 156 may be separate pieces that are attached to the mounting surface 14 by adhesive bonding or the use of conventional fasteners. Likewise, the texturing and/or beveling of the edges of the working surface of the table top and the introduction of depressions into the mounting surface may also be accomplished after the table top 12 is molded by a variety of conventional methods readily known in the art.

As best illustrated in FIG. 1, when the utility table 10 is disposed in an upright position in relation to an underlying surface and the support pedestals 18, 20 extended with the collars 108 placed over the overlapping portions 106 of the respective pivotal support braces 24, 30, the utility table 10 of the present invention is positioned for use. When a user desires to collapse the utility table 10 for storage, one presently preferred method for doing so is to invert the utility table 10, as shown in FIG. 3. With the utility table 10 in the inverted position, the collars 108 may be slid away from engagement with the overlapping portion 106 of the respective pivotal support braces 24, 30. This allows the support pedestals 18, 20 to be folded inwardly toward the table top 12 into the collapsed position. With the support pedestals 18, 20 in the collapsed position, the utility table 10 can easily be moved and stored.

Figure 4:
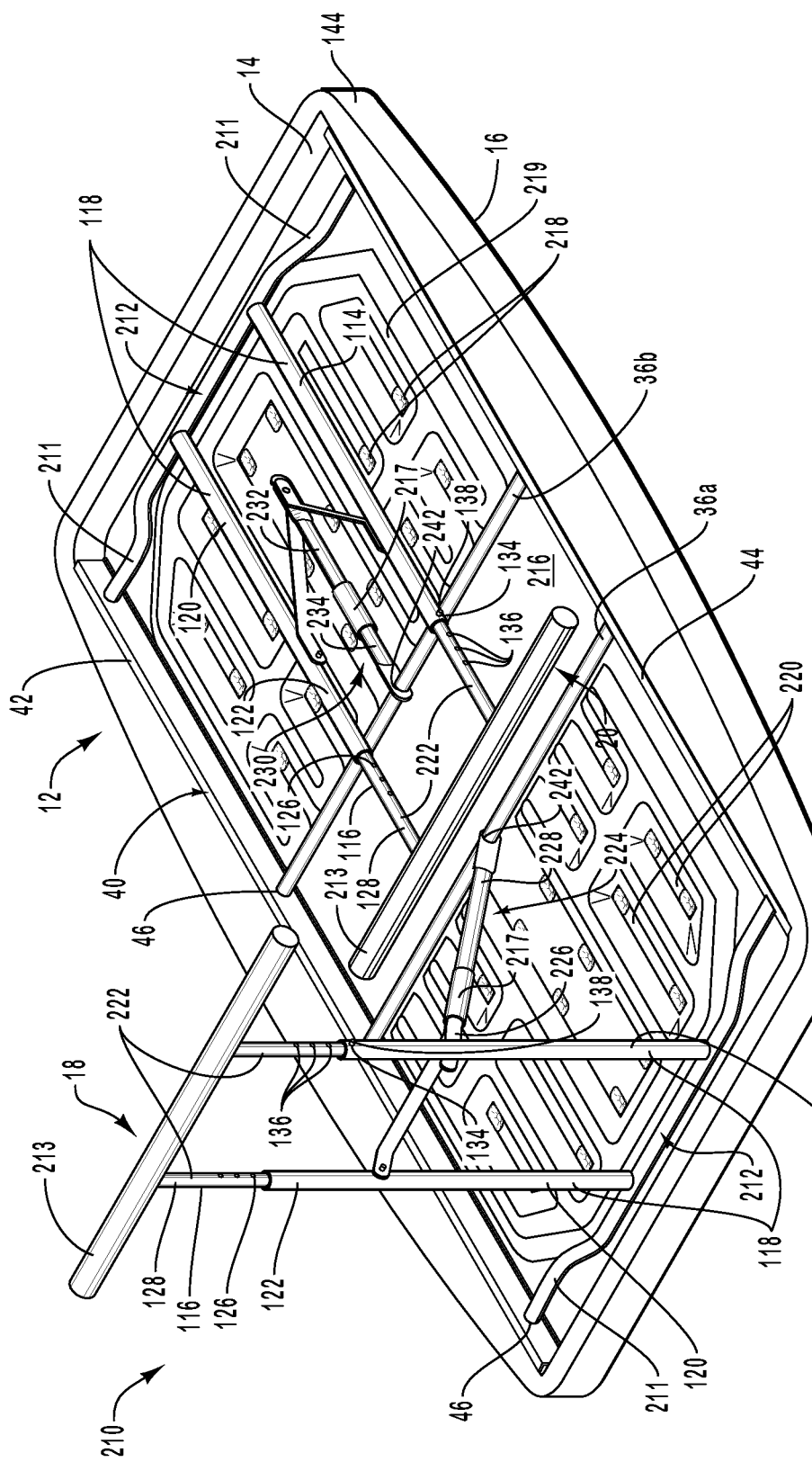
FIG. 4 is a perspective view of another presently preferred embodiment of the portable folding utility table that includes two center support assemblies.

With reference now to FIG. 4, another presently preferred embodiment of the utility table of the present invention is generally designated at 210. In this embodiment, the utility table 210 includes a table top 12 having a mounting surface 14 and a working surface 16 disposed opposite the mounting surface 14. A first support pedestal 18 and a second support pedestal 20 are pivotally attached to the mounting surface 14 of the table top 12. Preferably, the first and second support pedestals 18 20 are independently attached to a support bar 212 having opposing ends 211 configured to engage receiving apertures 46 formed in opposing side rails 42, 44 of a rigid flame 40 supportably disposed in relation to the table top 12.

In one presently preferred embodiment, the support bar 212 is configured having a bend formed at its opposing ends 211 to ensure that the first and second support pedestals 18, 20, respectively, fold properly against the mounting surface 14 of the table top 12 when disposed in the collapsed position As appreciated, the slight bend formed at the opposing ends 211 of the support bar 212 has the structural effect of extending the central portion of the support bar 212 away from the axis of rotation of the support bar 212 relative to the frame 40. Moreover, the bending configuration of the support bar 212 at its opposing ends 211 provides additional safety, in proportion to the weight applied against the table top 12, by maintaining the first and second support pedestals 18 and 20 in the extended position The support bar 212 may be omitted from engagement with the proximal end 120 of the support pedestals 18, 20 in favor of a suitable attachment assembly designed to facilitate pivotal engagement between the support pedestals 18, 20 and the mounting surface 14 of the table top 12. Those skilled in the art will readily recognize other possible modifications and adaptations which are consistent with the spirit and scope of the present invention and which are herein contemplated by the present invention.

Still referring to FIG. 4, the utility table 210 of the present invention may include each first member 114 of the support pedestals 18, 20 having a pair of outer members 118 each having a proximal end 120 and a distal end 122. The proximal end of each outer member 118 is connected to the table top 12 by means of the support bar 212 to which they are preferably fixed (e.g., welded). The second member 116 of each support pedestal 18, 20 includes a pair of inner members 124 each having a proximal end 126 and a distal end 128. The proximal end 126 of the inner members 124 are configured in dimensional size and shape to slidably engage the distal ends 122 of the outer members 118 in telescopic engagement.

Preferably, the inner members 124 and outer members 118 are separated by a hard plastic bushing (not shown) to facilitate the slidable movement of the inner members 124 relative to the outer members 118. Each bushing may be held in place with two small extensions that extend through small holes (not shown) in the outer members 118. It will be appreciated by those of skill in the art that there are numerous ways to facilitate the telescopic movement of the first member 114 relative to the second member 116 of each support pedestal 18, 20 which are readily contemplated herein. It is also contemplated herein that the length of the support pedestals 18, 20 may be fixed and, thus not selectively adjustable to a plurality of heights.

As illustrated in FIG. 4, an elongated foot member 213 may be rigidly attached at the distal end 128 of each of the inner members 124 of the support pedestals 18, 20 so as to provide additional stability to the table top 12 when disposed in the upright position.

Preferably, the foot member 213 facilitates a more even dispersion of the supportable weight of the utility table 210 over a greater portion of the underlying surface in addition, because the length of the foot member 213 tends to span the distance between the first and second members 114, 116, one or more stabilizer arms 90 may be unnecessary.

Similar to the preferred embodiments of the utility table illustrated in FIGS. 1-3, the utility table 210 includes a first pivotal support brace 224 having a bifurcated proximal end 226 attached to the first support pedestal 18 and a distal end 228 pivotally attached to a first retaining assembly 36a. Similarly, a second pivotal support brace 230 having a bifurcated proximal end 232 attached to the second support pedestal 20 and a distal end 234 pivotally attached to a second retaining assembly 36b. In one presently preferred embodiment, each of the retaining assemblies 36a, 36b comprise a cross-brace member having opposing ends and an intermediate body portion formed therebetween. Each of the distal ends 228, 234 of the pivotal support braces 224, 230 are configured with openings 242 having an internal periphery sufficient for engaging at least a portion of the length of the intermediate body portion of the cross-brace members 36a, 36b, respectively.

The opposing ends of the first and second cross-brace members 36a, 36b, respectively, are configured so as to be introduced and retained within corresponding retaining apertures 46 formed in opposing side rails 42, 44 of the frame 40 or, in the alternative, within opposing, interior side walls of the table top 12. Preferably, the first and second cross-brace members 36a, 36b are separated by a central portion 216 of the table top 12. Structurally, this central portion 216 of the table top 12 must have sufficient structural integrity to support a compressive load, either through the frame 40, the entire surface of the table top 12, or by some combination of the two, when weight is applied against the table top 12 to avoid bowing.

The dual cross-brace supportable configuration of the utility table 210 of the present invention is advantageous because the pivotal support braces 24, 30 obstruct less of the available space beneath the table top 12 and between the support pedestals 18, 20 Consequently, more room is available to accommodate the legs of one or more users beneath the table top 12, thereby making the utility table 210 more comfortable to users. Furthermore, the absence of the cross-brace members 36a, 36b from the central portion 216 of the table top 12 provides usable storage space to accommodate the foot members 213 when the support pedestals 18, 20 are disposed in the collapsed position. As will be appreciated by those skilled in the art, the central portion 216 integrally formed in the mounting surface 14 of the table top 12 may be configured having a wider or narrower dimension than illustrated by way of example in FIG. 4, depending on the overall extended length of the table top 12, the supportable weight the table top is designed to bear, the size of the foot members 213, and/or the need for usable space beneath the table top 12 when the utility table 210 is disposed in the usable position.

In one presently preferred embodiment, a pair of locking collars 217 is provided which slidably engage respective overlapping portions of the pivotal support braces 224, 230. The locking collars 217 are preferably configured and sized such that when the support pedestals 18, 20 are selectively disposed in the extended position, the locking collars 217 may be engageably positioned in relation to the overlapping portions to prevent the bifurcated proximal ends 226, 232 from moving relative to the corresponding distal ends 228, 234 of the pivotal support braces 224, 230, thus preventing the support pedestal supports 18, 20 from being positioned in the collapsed position without first disengaging the locking collars 217, respectively.

As with the previous preferred embodiments illustrated in FIGS. 1-3, a plurality of kiss-offs 218 may be formed in the mounting surface 14 of the table top 12 to add structural integrity and strength to the working surface 16 of the blow molded table top. In addition, a plurality of plateaus 219 and longitudinal trenches 220 may also be formed in the mounting surface 14 to further add stiffening and strength to the table top 12. Correspondingly, these plateaus 219 and trenches 220 operably function to increase the section modulus of the table top 12 by moving material away from the neutral axis of the table top 12, thus making it more difficult to bend the table top 12 in a longitudinal direction, as when a heavy load is positioned in the middle of the table top 12. As will be appreciated, the kiss-offs 218 may be formed within the trenches 220 to ensure that the table top 12 can be made hollow without concern that the working surface 16 may have a tendency to flex inwardly toward the mounting surface 14 when a weight is placed on the table top 12.

Additionally, an opening 222 may be formed in the table top 12 to provide means for introducing a support pole of an umbrella assembly (not shown) or the like. Although certain structural elements and components, such as: (1) one or more stabilizer arms 90 engageably disposed in relation to the first and second member 114, 116 of the support pedestals 18, 20 (see FIGS. 2 and 3); (2) one or more mounting members 148 for supportably retaining the retaining assembly 36 in relation to the mounting surface 14 of the table top 12 (see FIGS. 2 and 3); (3) one or more securing members 152 attached to the mounting surface 14 of the table top 12 for securing the support pedestals 18, 20 in the collapsed position (see FIGS. 2 and 3); (4) one or more manifolds 154, 156 that assist in facilitating the blow molding process by providing for uniform dispersion of air along the length of the blow molded table top 12 (see FIGS. 2 and 3); and (5) beveled edges and/or a textured working surface 16 (see FIG. 1) have been omitted from the embodiment of the utility table 210 illustrated in FIG. 4. It is contemplated herein that one or more of these structural features, however, may be incorporated into the alternate design of the utility table 210, if desired.

Figure 5:
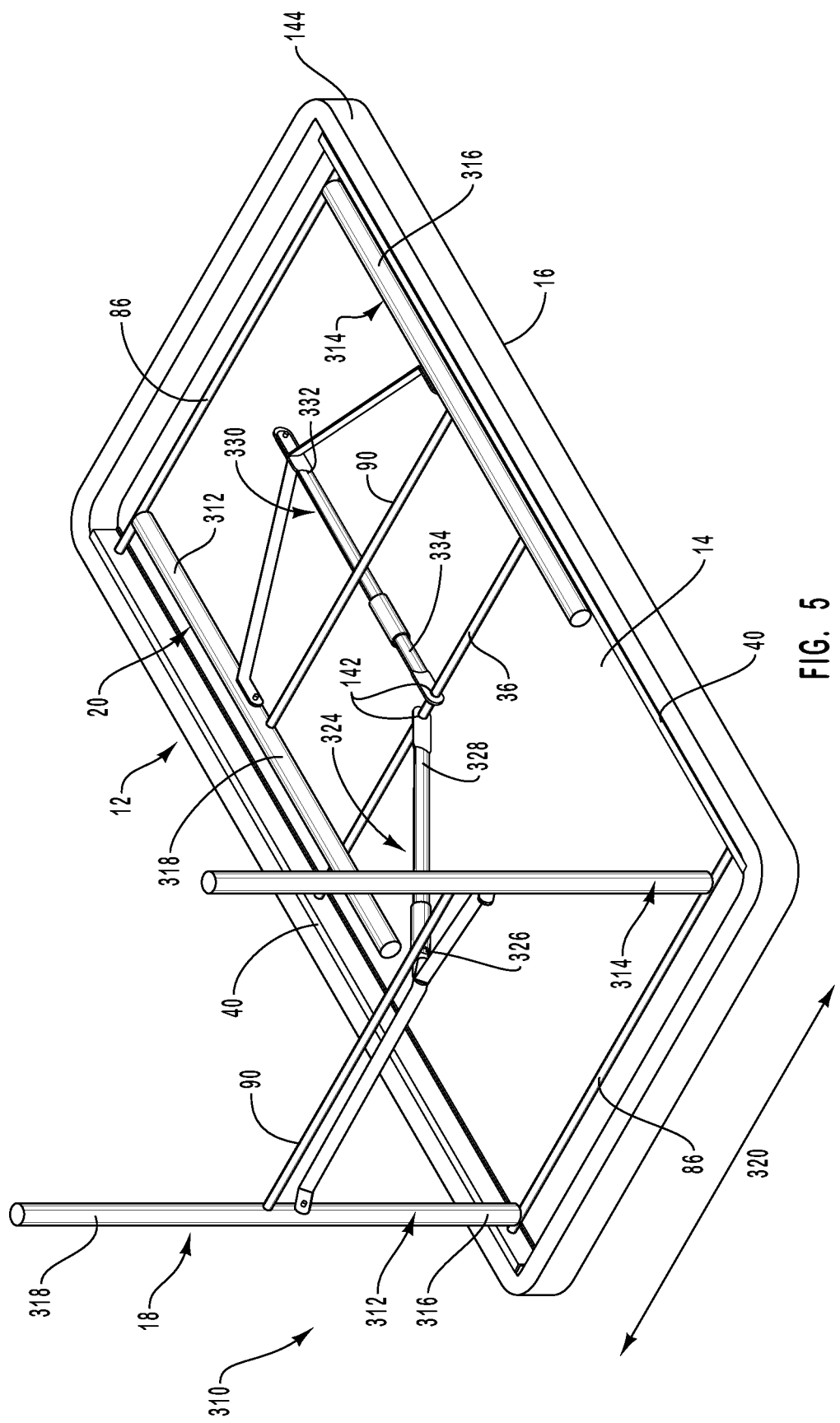
FIG. 5 is a perspective view of yet another presently preferred embodiment of the portable folding utility table with center support assembly with an off-set disposition of the legs of the opposing support pedestals.

With reference now to FIG. 5, another presently preferred embodiment of the utility table of the present invention is (generally designated at 310. As shown, the utility table 310 includes a table top 12 having a mounting surface 14 and a working surface 16 disposed opposite the mounting surface. Structurally, the table top 12 is preferably supported above an underlying surface by a first support pedestal 18 and a second support pedestal 20 disposed at spaced-apart relationship to the first support pedestal. Both the first and second support pedestals 18, 20 are preferably attached to the mounting surface 14 or, in the alternative, to a rigid support frame 40. A first pivotal support brace 324 includes a proximal end 326 pivotally attached to the first support pedestal 18 and a distal end 328 pivotally attached to a retaining assembly 36. Similarly, a second pivotal support brace 330 is shown having a proximal end 332 pivotally attached to the second support pedestal 20 and a distal end 334 pivotally attached to the retaining assembly 36 As will be appreciated, the distal ends 328, 334 of the first and second pivotal support brace 324, 330, respectively, may be pivotally attached to the mounting surface 14 by means of a engaging bracket (not shown).

Because the alternate preferred embodiment of the utility table 310, as illustrated in FIG. 5, is substantially similar in construction to the utility table 10 shown in FIGS. 1-3, only those structural variations which exist between these two embodiments will be further disclosed hereinbelow.

Specifically, one presently preferred embodiment of the utility table 310 includes a first support pedestal 18 having two support legs 312, 314. Each of the support legs 314, 312 of the first support pedestal 18 may be formed having a proximate end 316 rigidly attached to a cross pole 86 mounted in pivotal relation to the frame 40 or, in the alternative, to the mounting surface 14 of the table top 12 independent of the other leg. Similarly, each of the support legs 314, 312 of the second support pedestal 20 may be formed having a proximate end 316 rigidly attached to a cross pole 86 mounted in pivotal relation to the frame 40 or, in the alternative, to the mounting surface 14 of the table top 12 independent of the other leg.

To accommodate a table top 12 having a length that is smaller than the fixed or extendable length of the legs 312, 314 of the support pedestals 18, 20, the relative disposition of the distal ends 318 of each of the support legs 312, 314 of the first support pedestal 18 are offset from the corresponding distal ends 318 of each of the support legs 312, 314 of the second support pedestal 20 disposed on an opposite side of the table top 12. The distal end 318 of the first support leg 312 of the first support pedestal 18 is offset in a lateral direction 320 from the second support leg 314 of the first support pedestal. Similarly, the distal end 318 of the first support leg 312 of the second support pedestal 20 is offset in a lateral direction 320 from the second support leg 314 of the second support pedestal 20. This offset configuration enables the use of a smaller table top 12 and frame 40 because the support pedestals 18, 20 can include a length greater than the distance between the opposing ends of the table top 12, and yet still fold into a parallel configuration relative to the mounting surface 14 of the table top 12 without interference by the distal ends 318 of each of the support legs 312, 314 of the first and second support pedestals 18, 20.

The foregoing function can be structurally accomplished in a variety of ways. For example, both the proximal and distal ends 316, 318 of the support legs 312, 314 may be laterally offset so that the legs 312, 314 are always parallel to the frame 40, as shown in FIG. 5. Alternatively, the proximal ends 316 may remain aligned in the folded position, and the legs 312, 314 may fold at an angle. This may be done by pivotally mounting the proximal ends 316 to the mounting surface 14 at an angle, or by mounting the cross pole 86 at a diagonal angle with respect to the frame 40 and table top 12.

As discussed above, the retaining assembly 36 generally provides structural support to the center of the table top 12 of the utility table 310. It will be further appreciated that with the distal ends 328, 334 attached contiguous each other in retention to the cross-brace member 36, forces applied to the table top 12 which would ordinarily be transferred through one of the support pivotal braces 324, 330, respectively, into the table top 12 causing it to bow, will substantially be nullified by the counter force provided by the opposing pivotal support brace 324, 330, respectively.

For example, the horizontal component of a force applied by a user at one end of the table top 12 will act upon the one of the support pedestals 18, 20 and, because the distal ends 328, 334 of the pivotal support braces 224, 330, respectively, are attached to the retaining assembly 36, an equal and opposite horizontal force component applied by the other pivotal support brace 18, 20 will cancel out the horizontal force component of the original force. Accordingly, although the support legs 212, 214 of the support pedestals 18, 20 are offset, the structural configuration of the present invention provides increased structural support to the table top 12 with fewer parts. As will be appreciated by those skilled in the art, the retaining assembly 36 may be disposed in a variety of configurations which are consistent with the spirit and scope of the present invention so as to slow the pivotal support braces 324, 330 to supportably interrelate with each other. Moreover, the utility table 210 shown in FIG. 4 and discussed in detail hereinabove, may include support pedestals 18, 20 that comprise spaced apart support legs which are offset from the corresponding support legs of the opposing support pedestal to provide the advantages of overlapping the legs, if desired.

Although certain structural elements and components, such as: (1) telescoping support legs operable to adjust the height of the table top 12 above an underlying surface, (2) a second cross-brace member 36b formed independent of a first cross-brace member 36a (see FIG. 4); (3) a plurality of kiss-offs 158 formed in the mounting surface 14 of the table top 12 (see FIGS. 2 and 3), (4) one or more mounting members 148 for supportably retaining the retaining assembly 36 in relation to the mounting surface 14 of the table top 12 (See FIGS. 2 and 3), (5) one or more securing members 152 attached to the mounting surface 14 of the table top 12 for securing the support pedestals 18, 20 in the collapsed position (see FIGS. 2 and 3); (6) one or more manifolds 154, 156 that assist in facilitating the blow molding process by providing for uniform dispersion of air along the length of the blow molded table top 12 (see FIGS. 2 and 3); (7) a bend formed in the opposing ends 211 of the support bar 212 (see FIG. 4); (8) beveled edges and/or a textured working surface 16 (See FIG. 1); and (9) a plurality of plateaus 219 and longitudinal trenches 220 may also be formed in the mounting surface 14 to further add stiffening and strength to the table top 12 (see FIG. 4) have been omitted from the embodiment of the utility table 310 illustrated in FIG. 5. It is contemplated herein that one or more of the foregoing structural however, may be incorporated into the design of the utility table 310, if desired.

Many of the problems associated with prior art portable folding utility tables are addressed by the teachings of the present invention. From the above discussion, it will be appreciated that the present invention provides a novel portable folding utility table having a center support assembly that is durable enough to withstand increased wear and tear, yet is lightweight enough to easily set up and take down. The present invention also provides a utility table with a center support retaining assembly that provides increased stability and structural integrity with an efficient design that allows the interrelation of the support pedestals to each other. The center support retaining assembly of the utility table of the present invention is also cost effective to manufacture and does not compromise the structural integrity of the table top. The present invention also provides a portable folding utility table that includes a work surface disposed at a height that is comfortable to work at. Additionally, features are provided to improve the functionality of longer and smaller tables under various use and loading conditions.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A molded plastic table top comprising:
   an upper surface;
   a lower surface spaced apart from the upper surface by a distance;
   a hollow interior portion, at least a portion of the upper surface and at least a portion of the lower surface enclosing at least a portion of the hollow interior portion of the table top, the upper surface, the lower surface and the hollow interior portion being integrally formed as part of a unitary, one-piece structure;
   a lip extending downwardly from the lower surface of the table top, the lip disposed at least proximate a first side of the table top; and
   a plurality depressions including a generally uniform configuration and being integrally formed in the lower surface as part of a unitary, one-piece structure, the depressions being disposed in a generally uniform pattern that covers at least a substantial portion of the lower surface, the depressions sized and configured to increase the strength of the table top, at least five depressions of the plurality of depressions generally aligned with and disposed parallel to an inner surface of the lip.

2. The table top as in claim 1, further comprising a channel disposed between at least a portion of the interior surface of the lip and the elongated frame member.

3. The table top as in claim 2, wherein the lip, the elongated frame member and the channel are disposed in a generally parallel configuration.

4. The table top as in claim 1, wherein the depressions have a generally consistent spacing between adjacent depressions, the depressions cover substantially the entire lower surface, and the depressions are sized and configured to support the upper surface in a generally consistent manner.

5. The table top as in claim 1, wherein the depressions have a generally consistent spacing between adjacent depressions, the depressions cover substantially the entire lower surface, and the depressions are sized and configured to support the upper surface in a generally consistent manner.

6. A table comprising:
   a table top constructed from molded plastic, the table top comprising:
      a working surface;
      a mounting surface;
      a first side rail disposed along a first side of the table top;
      a second side rail disposed along a second side of the table top;
      a plurality depressions including a generally uniform configuration and being integrally formed in the mounting surface of the table top, the depressions being disposed in a generally uniform pattern that covers at least a substantial portion of the mounting surface, each of the plurality of depressions extending towards the working surface of the table top, the depressions sized and configured to add support and structural integrity to the table top, the plurality of depressions comprising:
         a first row of at least ten depressions generally aligned parallel to the first side of the table top and extending along a length of the table top, the first row of depressions disposed at least proximate the first side rail;
         a second row of at least ten depressions generally aligned parallel to the first side of the table top and extending along the length of the table top;
         a first row of at least ten depressions generally aligned parallel to the second side of the table top and extending along a length of the table top; and
         a second row of at least ten depressions generally aligned parallel to the second side of the table top and extending along the length of the table top;
      a first support pedestal movable between a collapsed position and an extended position relative to the table top, the first support pedestal comprising a first support leg and a second support leg;
      a second support pedestal movable between a collapsed position and an extended position relative to the table top, the second support pedestal comprising a first support leg and a second support leg;
      a first pivoting support brace including a first end connected to the first support leg and the second support leg of the first support pedestal; and
      a second pivoting support brace including a first end connected to the first support leg and the second support leg of the second support pedestal.

7. The table as in claim 6, further comprising:
   a first sidewall of the table top, the first side rail attached to the first sidewall by a first plurality of fasteners; and
   a second sidewall of the table top, the second side rail attached to the second sidewall by a second plurality of fasteners.

8. The table as in claim 7, wherein the first sidewall is formed in the mounting surface of the table top and the first sidewall is disposed along a first edge of the table top; and
   wherein the second sidewall is formed in the mounting surface of the table top and the first sidewall is disposed a second edge of the table top.

9. The table as in claim 6, wherein the second row of at least ten depressions generally aligned parallel to the first side of the table top is offset from the first row of at least ten depressions generally aligned parallel to the first side of the table top; and
   wherein the second row of at least ten depressions generally aligned parallel to the second side of the table top is offset from the first row of at least ten depressions generally aligned parallel to the second side of the table top.

10. The table as in claim 6, wherein the first row of depressions generally aligned parallel to the first side of the table top includes at least fifteen depressions;
   wherein the second row of depressions generally aligned parallel to the first side of the table top includes at least fifteen depressions;
   wherein the first row of depressions generally aligned parallel to the second side of the table top includes at least fifteen depressions; and
   wherein the second row of depressions generally aligned parallel to the second side of the table top includes at least fifteen depressions.

11. The table as in claim 10, wherein the second row of depressions generally aligned parallel to the first side of the table top is offset from the first row of depressions generally aligned parallel to the first side of the table top; and
   wherein the second row of depressions generally aligned parallel to the second side of the table top is offset from the first row of depressions generally aligned parallel to the second side of the table top.

12. The table as in claim 6, wherein the first row of depressions generally aligned parallel to the first side of the table top is disposed immediately adjacent to the first side rail; and
   wherein the first row of depressions generally aligned parallel to the second side of the table top is disposed immediately adjacent to the second side rail.

13. The table as in claim 6, further comprising:
   a first sidewall of the mounting surface of the table top, the first side rail attached to the first sidewall by a first plurality of fasteners, the first row of depressions generally aligned parallel to the first side of the table top being disposed immediately adjacent to the first sidewall; and
   a second sidewall of the mounting surface of the table top, the second side rail attached to the second sidewall by a second plurality of fasteners, the first row of depressions generally aligned parallel to the second side of the table top is disposed immediately adjacent to the second sidewall.

14. The table as in claim 6, wherein none of the plurality of depressions are disposed between the first side rail and the first side of the table top; and
   wherein none of the plurality of depressions are disposed between the second side rail and the second side of the table top.

15. The table as in claim 6, wherein the first support pedestal is pivotally attached to the first side rail and the second side rail; and
   wherein the second support pedestal is pivotally attached to the first side rail and the second side rail.

16. The table as in claim 6, wherein a second end of the first pivoting support brace is connected to the mounting surface of the table top; and
   wherein a second end of the second pivoting support brace is connected to the mounting surface of the table top.

17. The table as in claim 6, wherein the plurality of depressions includes at least ten rows of depressions that extend along the length of the table top; and
   wherein the plurality of depressions includes at least ten columns of depressions that extend along a width of the table top.

18. The table as in claim 17, wherein each row of depressions includes at least ten generally aligned depressions; and
   wherein each column of depressions includes at least ten generally aligned depressions.

19. The table as in claim 6, wherein the plurality of depressions have a generally consistent spacing between adjacent depressions, the depressions cover substantially the entire mounting surface, and the depressions are sized and configured to support the working surface in a generally consistent manner.

20. The table as in claim 6, wherein the mounting surface of the table top is configured to facilitate attachment of the first side rail and the second side rail to the mounting surface.

21. The table as in claim 6, wherein the table top has a thickness measured between the working surface and the mounting surface between about one-half of a centimeter and about three-quarters of a centimeter.

22. The table as in claim 6, wherein the first side rail is attached to a mounting surface of the table top; and
   wherein the second side rail is attached to a mounting surface of the table top.

23. The table as in claim 6, wherein the second row of depressions along the first side of the table top is disposed at least proximate the first row of depressions along the first side of the table top; and
   wherein the second row of depressions disposed along the second side of the table top is disposed at least proximate the first row of depressions along the second side of the table top.

24. The table as in claim 6, further comprising:
   a first sidewall disposed along the first side of the table top, the first side rail attached to the first sidewall by a first plurality of fasteners, the first row of depressions disposed along the first side of the table top is disposed generally parallel to the first side rail; and
   a second sidewall disposed along the second side of the table top, the second side rail attached to the second sidewall by a second plurality of fasteners, the first row of depressions disposed along the second side of the table top disposed generally parallel to the second side rail.

25. The table as in claim 6, wherein the first side rail is disposed along the first side of the table top, the first side rail is attached to the table top by a first plurality of fasteners, the first row of depressions disposed along the first side of the table top being disposed generally parallel to the first side rail, the second row of depressions disposed along the first side of the table top being offset from the first row of depressions disposed along the first side of the table top; and
   wherein the second side rail is disposed along the second side of the table top, the second side rail attached to the table top by a second plurality of fasteners, the first row of depressions disposed along the second side of the table top being disposed generally parallel to the second side rail, the second row of depressions disposed along the second side of the table top being offset from the first row of depressions disposed along the second side of the table top.

* * * * *